United States Patent
Freda et al.

(10) Patent No.: US 12,336,044 B2
(45) Date of Patent: Jun. 17, 2025

(54) NR V2X SIDELINK POWER SAVING FOR UNICAST AND/OR GROUPCAST

(71) Applicant: InterDigital Patent Holdings, Inc., Wilmington, DE (US)

(72) Inventors: Martino M. Freda, Laval (CA); Jaya Rao, Montreal (CA); Tuong Duc Hoang, Montreal (CA); Tao Deng, Roslyn, NY (US); Moon-il Lee, Melville, NY (US); Ghyslain Pelletier, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 98 days.

(21) Appl. No.: 17/918,055

(22) PCT Filed: Mar. 30, 2021

(86) PCT No.: PCT/US2021/024804
§ 371 (c)(1),
(2) Date: Oct. 10, 2022

(87) PCT Pub. No.: WO2021/206952
PCT Pub. Date: Oct. 14, 2021

(65) Prior Publication Data
US 2023/0156858 A1    May 18, 2023

Related U.S. Application Data

(60) Provisional application No. 63/125,694, filed on Dec. 15, 2020, provisional application No. 63/006,944, filed on Apr. 8, 2020.

(51) Int. Cl.
*H04W 76/28* (2018.01)
*H04W 52/02* (2009.01)
*H04W 92/18* (2009.01)

(52) U.S. Cl.
CPC ....... *H04W 76/28* (2018.02); *H04W 52/0216* (2013.01); *H04W 52/0219* (2013.01); *H04W 52/0229* (2013.01); *H04W 92/18* (2013.01)

(58) Field of Classification Search
CPC ............. H04W 76/28; H04W 52/0216; H04W 52/0219; H04W 52/0229; H04W 92/18; Y02D 30/70
See application file for complete search history.

(56) References Cited

U.S. PATENT DOCUMENTS

| | | | |
|---|---|---|---|
| 2020/0092685 | A1 | 3/2020 | Fehrenbach et al. |
| 2023/0276364 | A1* | 8/2023 | Basu Mallick ... H04W 52/0235 370/311 |
| 2023/0337321 | A1* | 10/2023 | Tseng ................ H04W 52/0219 |

FOREIGN PATENT DOCUMENTS

| | | |
|---|---|---|
| WO | 2017196611 A1 | 11/2017 |
| WO | 2018064477 A1 | 4/2018 |
| WO | 2020/064555 A1 | 4/2020 |

OTHER PUBLICATIONS

3rd Generation Partnership Project (3GPP), TR 23.786 V0.8.0, "Technical Specification Group Services and System Aspects, Study on Architecture Enhancements for EPS and 5G System to Support Advanced V2X Services (Release 16)", Aug. 2018, pp. 1-78.

3rd Generation Partnership Project (3GPP), TS 22.186 V15.2.0, "Technical Specification Group Services and System Aspects, Enhancement of 3GPP Support for V2X Scenarios, Stage 1 (Release 15)", Sep. 2017, pp. 1-16.

(Continued)

*Primary Examiner* — Ayanah S George
(74) *Attorney, Agent, or Firm* — Condo Roccia Koptiw LLP

(57) ABSTRACT

Systems, methods, and instrumentalities are described herein that may be associated with new radio (NR) vehicular communication (V2X) sidelink power saving for unicast and groupcast. A first wireless transmit/receive unit (WTRU) may receive a message. The message may indicate a set of configuration groups and/or one or more suitability selection parameters. The WTRU may receive, from a second WTRU, (Continued)

a first indication. The first indication may indicate that the second WTRU is associated with a first configuration group and a first priority group. The first WTRU may receive, from a third WTRU, a second indication. The second indication may indicate that the third WTRU is associated with a second configuration group and a second priority value. The first WTRU may select a configuration group from the set of configuration groups based on the first indication and the second indication.

18 Claims, 6 Drawing Sheets

(56) References Cited

OTHER PUBLICATIONS

3rd Generation Partnership Project (3GPP), TS 23.303 V15.1.0, "Technical Specification Group Services and System Aspects, Proximity-based services (ProSe), Stage 2 (Release 15)", Jun. 2018, pp. 1-130.
3rd Generation Partnership Project (3GPP), TS 36.213 V14.4.0, "Technical Specification Group Radio Access Network, Evolved Universal Terrestrial Radio Access (E-UTRA), Physical Layer Procedures (Release 14)", Sep. 2017, pp. 1-462.
3rd Generation Partnership Project; Technical Specification Group Services and System Aspects; Study on enhancement of 3GPP Support for 5G VX2 Services (Release 15), TR 22.886 V15.3.0, Sep. 2018, 58 pages.

* cited by examiner

NR V2X SIDELINK POWER SAVING FOR UNICAST AND/OR GROUPCAST

CROSS-REFERENCE TO RELATED APPLICATIONS

This application is the National Stage Entry under 35 U.S.C. § 371 of Patent Cooperation Treaty Application No. PCT/US2021/024804, filed Mar. 30, 2021, which claims the benefit of Provisional U.S. Patent Application No. 63/006,944, filed Apr. 8, 2020, and Provisional U.S. Patent Application No. 63/125,694, filed Dec. 15, 2020, the disclosure of which is incorporated herein by reference in its entirety.

BACKGROUND

Mobile communications using wireless communication continue to evolve. A fifth generation may be referred to as 5G. A previous (legacy) generation of mobile communication may be, for example, fourth generation (4G) long term evolution (LTE).

SUMMARY

Systems, methods, and instrumentalities are described herein that may be associated with new radio (NR) vehicular communication (V2X) sidelink power saving for unicast and groupcast. A wireless transmit/receive unit (WTRU) (e.g., a first WTRU) may receive a message. The message may indicate a set of configuration groups and/or one or more suitability selection parameters. The first WTRU may receive, from a second WTRU, a first indication. The first indication may indicate that the second WTRU is associated with a first configuration group (e.g., associated with a first number of resources) and a first priority group. The first configuration group may belong to the set of configuration groups. The first WTRU may receive, from a third WTRU, a second indication. The second indication may indicate that the third WTRU is associated with a second configuration group (e.g., associated with a second number of resources) and a second priority value. The second configuration group may belong to the set of configuration groups. The first WTRU may select a configuration group from the set of configuration groups based on the first indication and the second indication, for example, where the selection of the configuration group satisfies the one or more suitability selection parameters. The first WTRU may send an indication (e.g., a third indication) of the selected configuration group to the second and/or third WTRUs. The suitability selection parameter(s) may comprise one or more resource thresholds. Satisfying the suitability selection parameter(s) may comprise one or more of the following: maintaining a resource usage at or below resource threshold(s) or maximizing the resource usage while maintaining the resource usage at or below the resource threshold(s). The first WTRU may select a configuration group based on a highest priority value, e.g., if more than one indicated configuration group satisfies the suitability selection parameter(s). The suitability selection parameter(s) may comprise one or more of the following: a WTRU category, a WTRU battery power, a WTRU active carrier number, or a WTRU session Quality of Service (QoS).

DETAILED DESCRIPTION

Figure 1A:
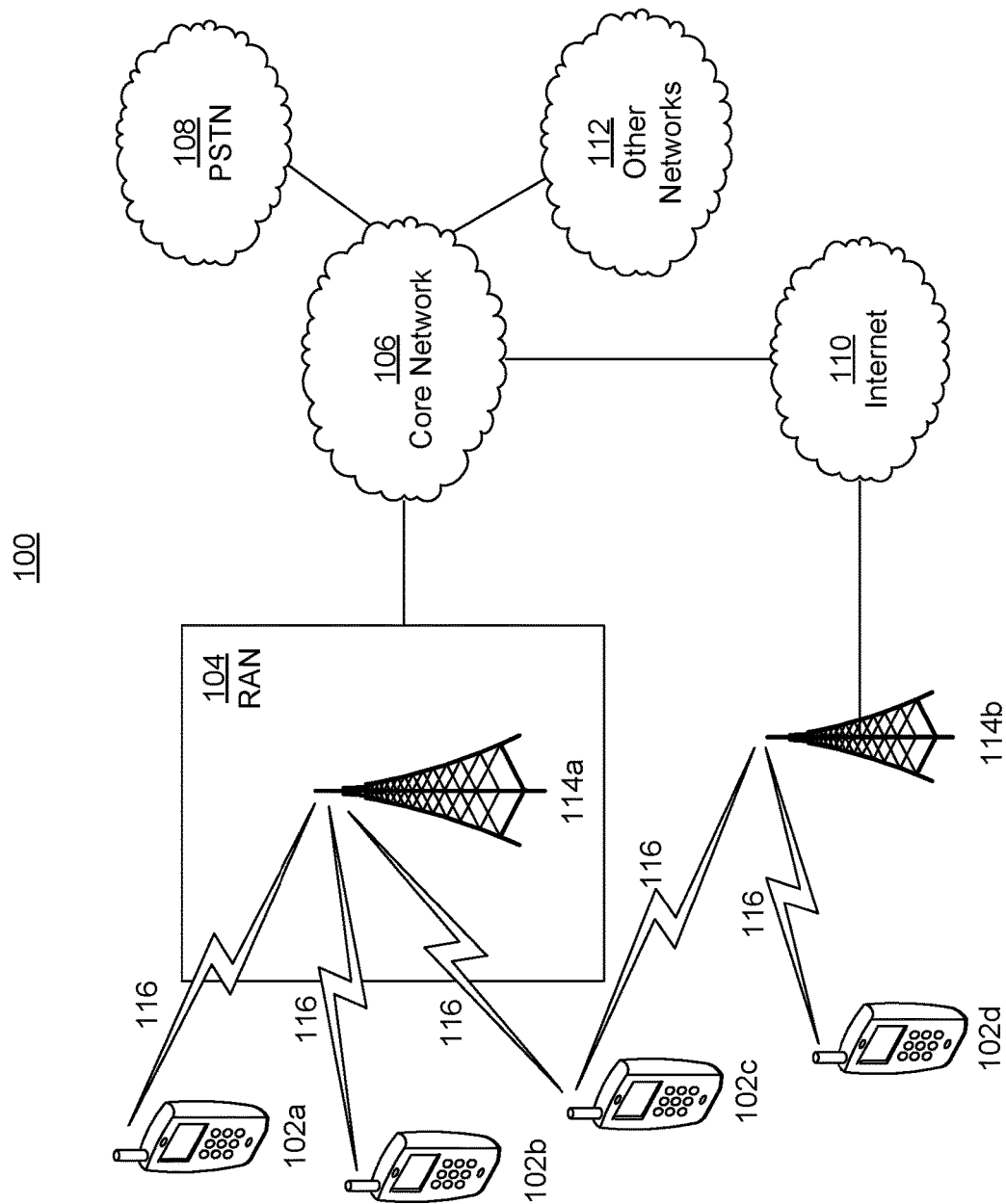
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c, and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B (eNB), a Home Node B, a Home eNode B, a gNode B (gNB), a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
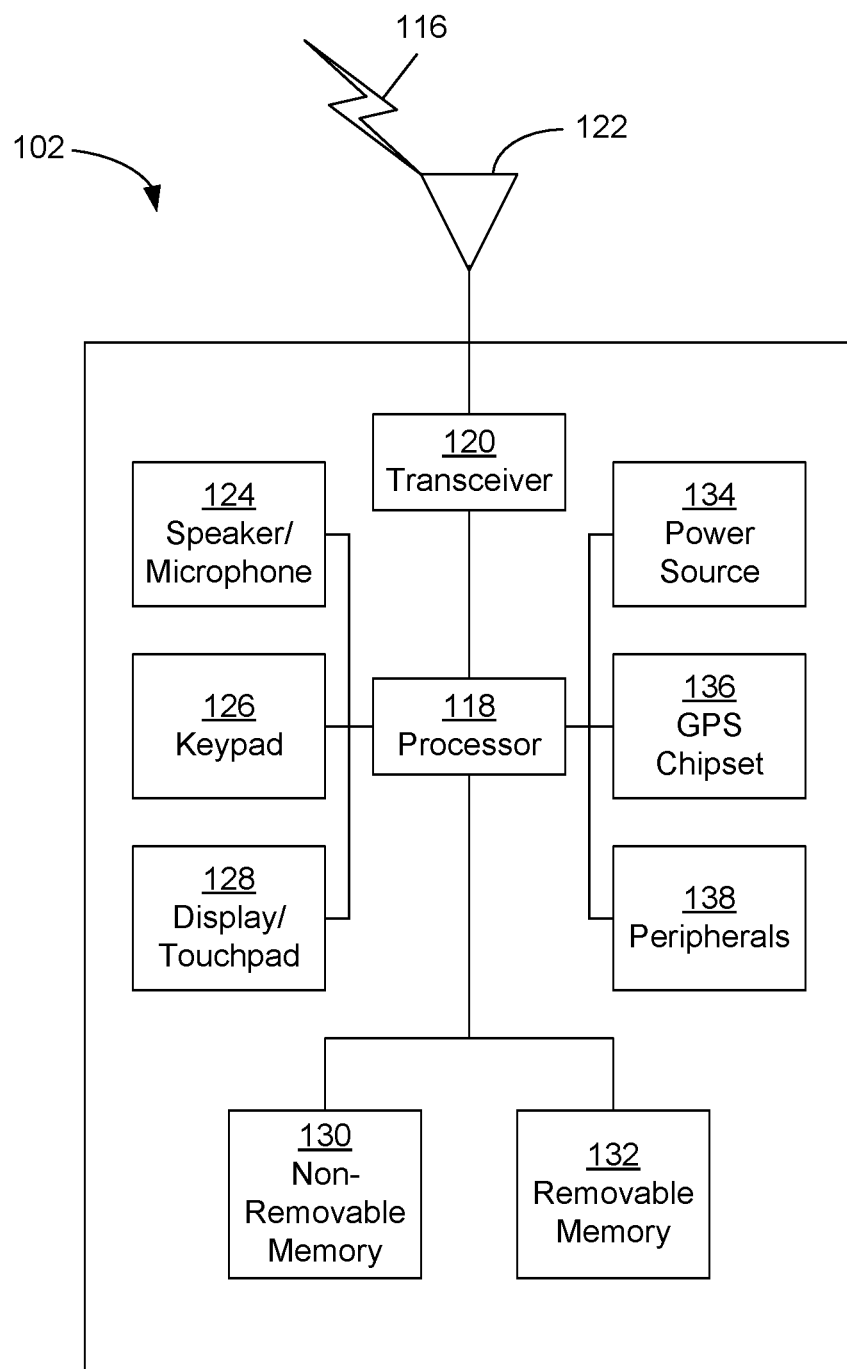
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
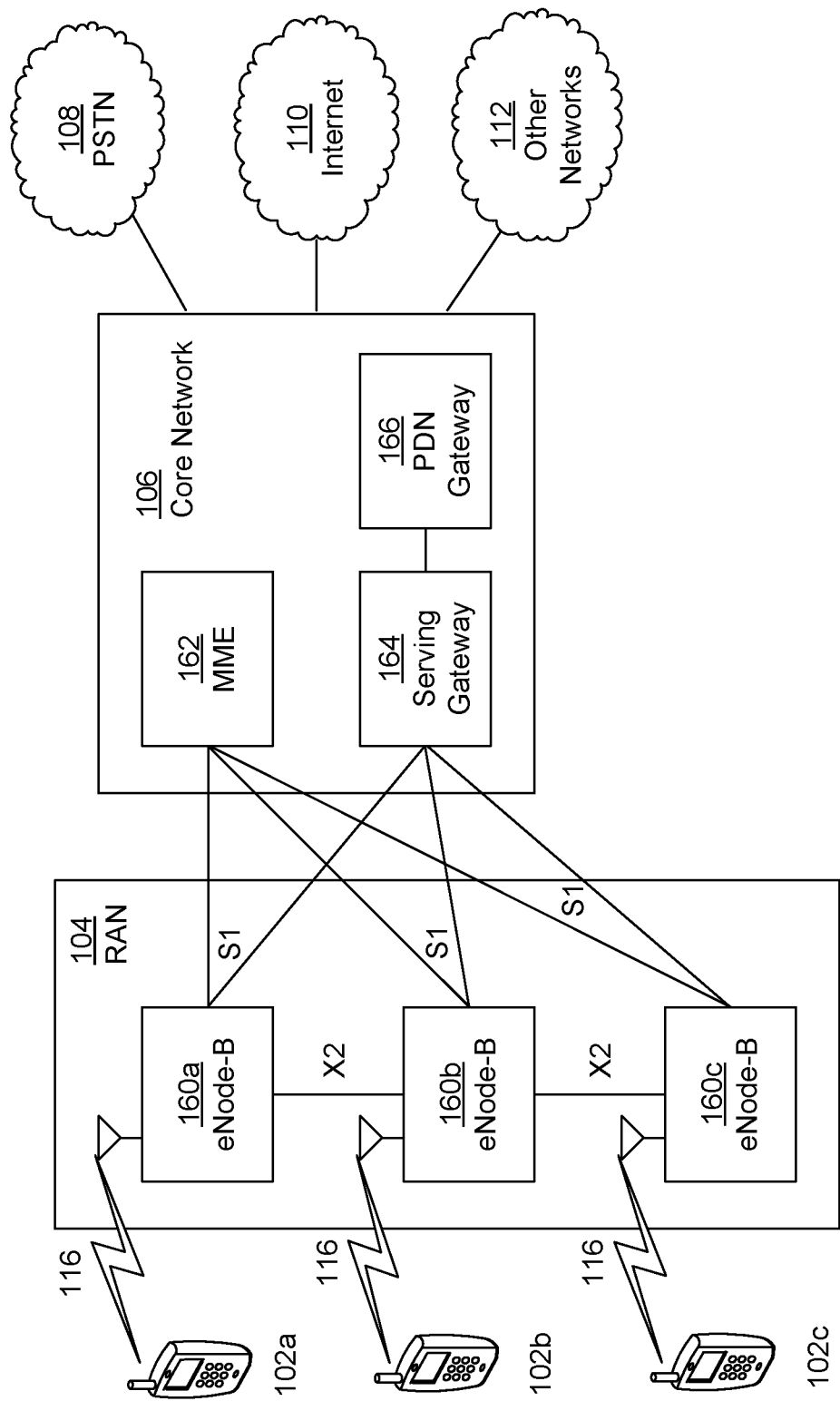
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
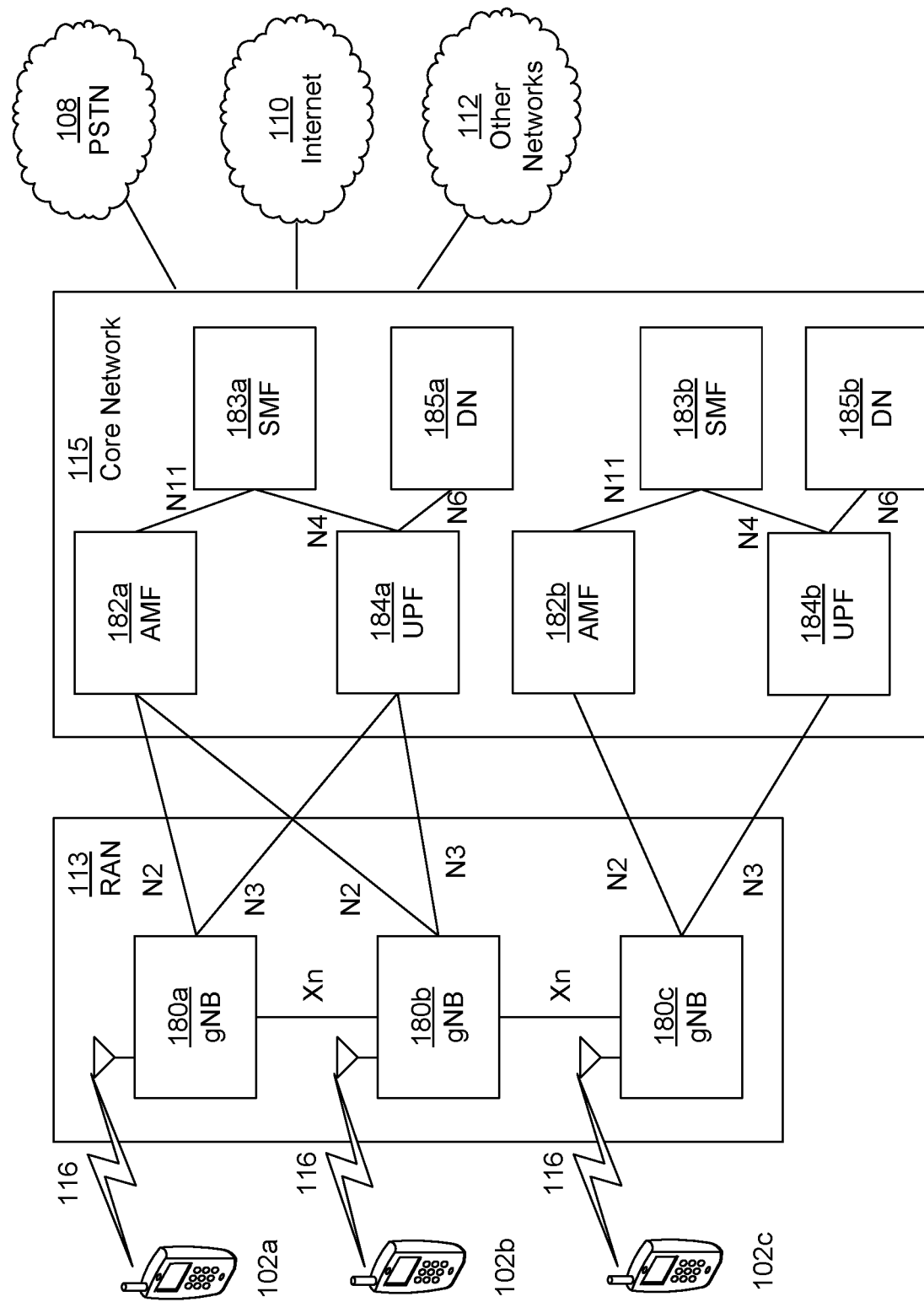
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

New Radio (NR) supports the use of unlicensed bands (e.g., up to 52.6 GHz). NR may support higher frequencies using unlicensed bands (e.g., from 52.6 GHz to 71 GHz). NR may implement, for example, high data rate enhanced mobile broadband (eMBB), mobile data offloading, short range high data rate device-to-device (D2D) communication, and industrial Internet of Things (IoT). Frequency ranges above 52.6 GHz may contain larger spectrum allocation and large bandwidth. Transmissions on frequencies above 52.6 GHz may experience high phase noise, large propagation loss, low power amplifier efficiency, and strong power spectral density regulatory requirements. Channel access may be enhanced, for example, by considering potential interference to/from other nodes, assuming beam-based operation, and complying with the regulatory requirements applicable to unlicensed spectrum for frequencies between 52.6 GHz and 71 GHz.

Vehicular communication (V2X) is a mode of communication whereby WTRUs can communicate with each other directly. There are multiple scenarios for V2X operations. In an example of an in-coverage scenario, WTRUs may receive assistance from a network to start transmitting and receiving V2X messages. In an example of an out of coverage scenario, WTRUs may use pre-configured parameters to start transmitting and receiving V2X messages.

V2X communication may be supported in LTE and new radio (NR). A predecessor or legacy of v2X may be Device-to-Device (D2D) communications. V2X communication services may consist of multiple (e.g., four) different types: vehicle to vehicle (V2V), vehicle to infrastructure (V2I), vehicle to network (V2N), and/or vehicle to pedestrian (V2P). In an example of V2V, vehicular WTRUs may communicate with each other directly. In an example of V2I, vehicular WTRUs may communicate with roadside units (RSUs) and/or eNBs. In an example of V2N, vehicular WTRUs may communicate with a core network (CN). In an example of V2P, vehicular WTRUs may communicate with WTRUs with special conditions, e.g., low battery capacity.

V2X resources may be allocated (e.g., in LTE). LTE may have multiple (e.g., two) modes of operation in V2X communication (e.g., mode3 and mode4). In an example of Mode 3, a network may provide a WTRU with a scheduling assignment for V2X sidelink (SL) transmission. In an example of Mode 4, a WTRU may autonomously select resources from a configured/pre-configured resource pool. V2X LTE may support multiple (e.g., two) categories of resource pools (e.g., receiving pools and transmitting pools). Receiving pools may be monitored to receive V2X transmissions. V2X transmitting pools may be used by WTRUs to select a transmission resource (e.g., in Mode 4). Transmitting pools may not be used by WTRUs configured in Mode 3.

Resource pools (e.g., in LTE) may be (e.g., semi-statically) signaled to WTRUs (e.g., via radio resource control (RRC) signaling). A WTRU (e.g., in Mode 4) may use sensing, for example, before selecting a resource from a (e.g., an RRC) configured transmitting pool. LTE V2X may not support dynamic resource pool reconfiguration. Pool configuration may (e.g., only) be carried via system information block (SIB) and/or (e.g., dedicated) RRC signaling.

New Radio (NR) may support V2X access technology. NR may refer to the next generation of wireless systems. NR systems may support, for example, enhanced Mobile Broadband (eMBB) and ultra-high reliability and low latency communications (URLLC).

NR may support enhanced V2X (eV2X) communication. eV2X may support services for safety and non-safety scenarios (e.g., sensor sharing, automated driving, vehicle platooning, remote driving, and so on). Different eV2X services may have different performance requirements (e.g., 3 ms latency).

Vehicle platooning may enable vehicles to dynamically form a group travelling together. Vehicles in a platoon may receive periodic data from a (e.g., the leading) vehicle, for example, to carry on platoon operations. The data (e.g., information) may allow the distance between vehicles to become extremely small, e.g., the gap distance translated to time may be very low (e.g., sub second). Platooning applications may allow (e.g., following) vehicles to be autonomously driven.

Advanced driving may enable semi-automated or fully-automated driving. Longer inter-vehicle distance may be assumed. A (e.g., each) vehicle and/or RSU may share data obtained from local (e.g., vehicle) sensors with vehicles in proximity, allowing vehicles to coordinate their trajectories or maneuvers. A (e.g., each) vehicle may share a driving intention with vehicles in proximity. Advanced driving may support safer traveling, collision avoidance, and/or improved traffic efficiency.

Extended sensors may enable an exchange of raw and/or processed data, e.g., gathered through local sensors and/or live video data among vehicles, RSUs, pedestrian devices, and/or V2X application servers. A vehicle may enhance the perception of a vehicle's environment beyond what the vehicle's sensors can detect, for example, to provide a more holistic view of a local situation.

Remote driving may enable a remote driver or a V2X application to operate a remote vehicle, for example, for passengers who cannot drive themselves or remote vehicles located in dangerous environments. Driving based on cloud computing may be used, for example, when variation is limited and routes are predictable, such as public transportation. Access to a cloud-based back-end service platform may be considered for a use case group.

Quality of service (QoS) may be provided for NR V2X. In an example, QoS over PC5 may be supported with Proximity Services (ProSe) Per-Packet Priority (PPPP). Application layer may mark packets with a PPPP, which may indicates a (e.g., required) QoS level. A packet delay budget (PDB) may be derived from a PPPP.

Performance indicator parameters may include, for example, one or more of the following: payload (e.g., bytes); transmission rate (e.g., messages/second); maximum end-to-end latency (e.g., in ms); reliability (e.g., as a percentage); data rate (megabits per second (Mbps)); minimum (e.g., required) communication range (meters).

In an example, the same set of service requirements may be applied to PC5 based V2X communication and Uu based V2X communication. QoS characteristics may be represented with a 5G QoS Identifier (5QI).

A unified QoS model for PC5 and Uu (e.g., using 5QIs for V2X communication over PC5) may provide the application layer with a consistent way to indicate QoS requirements regardless of the link used.

There may be multiple (e.g., three) different types of traffic: broadcast, multicast, and unicast (e.g., considering 5GS V2X capable WTRUs).

A QoS Model used for of Uu may be used for a unicast type of traffic. In an example, a (e.g., each) unicast link may be treated as a bearer. QoS flows may be associated with unicast link(s)/bearer(s). QoS characteristics defined in 5QI and additional parameter(s) (e.g., data rate) may be applicable. A minimum (e.g., required) communication range may be treated as an additional parameter (e.g., specifically for PC5 use).

Similar considerations may be applied to multicast traffic, which may be treated as a special case of unicast, e.g., with multiple defined receivers of the traffic.

A bearer concept may be inapplicable to broadcast traffic. A (e.g., each) message may have different characteristics relative to other messages, e.g., according to (e.g., requirements) of an application. 5QI may be used in a similar manner as used for PPPP and/or ProSe per packet reliability (PPPR), e.g., to be tagged with each packet. 5QI may be used to represent (e.g., all) characteristics (e.g., needed) for a PC5 broadcast operation, e.g., latency, priority, reliability, etc. A group of V2X broadcast specific 5QIs (e.g., V2X QoS Indicators (VQIs)) may be defined for PC5 use.

PC5 QoS parameters may be negotiated (e.g., between WTRUs), for example, at the establishment of a one-to-one communication procedure. The same QoS may be used in both directions, for example, after a PC5 QoS parameter negotiation procedure.

Systems, methods, and instrumentalities are described herein that may be associated with new radio (NR) vehicular communication (V2X) sidelink power saving for unicast and groupcast. A wireless transmit/receive unit (WTRU) (e.g., a first WTRU) may receive a message. The message may indicate a set of configuration groups and/or one or more suitability selection parameters. The first WTRU may receive, from a second WTRU, a first indication. The first indication may indicate that the second WTRU is associated with a first configuration group (e.g., associated with a first number of resources) and a first priority group. The first configuration group may belong to the set of configuration groups. The first WTRU may receive, from a third WTRU, a second indication. The second indication may indicate that the third WTRU is associated with a second configuration group (e.g., associated with a second number of resources)

and a second priority value. The second configuration group may belong to the set of configuration groups. The first WTRU may select a configuration group from the set of configuration groups based on the first indication and the second indication, for example, where the selection of the configuration group satisfies the one or more suitability selection parameters. The first WTRU may send an indication (e.g., a third indication) of the selected configuration group to the second and/or third WTRUs. The suitability selection parameter(s) may comprise one or more resource thresholds. Satisfying the suitability selection parameter(s) may comprise one or more of the following: maintaining a resource usage at or below resource threshold(s) or maximizing the resource usage while maintaining the resource usage at or below the resource threshold(s). The first WTRU may select a configuration group based on a highest priority value, e.g., if more than one indicated configuration group satisfies the suitability selection parameter(s). The suitability selection parameter(s) may comprise one or more of the following: a WTRU category, a WTRU battery power, a WTRU active carrier number, or a WTRU session Quality of Service (QoS).

An activity state configuration may be selected (e.g., during link establishment) based on, for example, one or more of the following: a configuration obtained from the network, an association with quality of service (QoS) flows and/or sidelink radio bearers (SLRBs), one or more decision rules (e.g., when multiple configurations are associated), a Uu configuration aspect, a wireless transmit receive unit (WTRU) type or a link type, a WTRU Location, and/or a dependence on a peer WTRU capability.

A WTRU may monitor (e.g., independently monitor) the sidelink (e.g., only the sidelink) for the activity behavior of an active session (e.g., each active session) based on, for example, one or more of the following: time and/or frequency resources, a property associated with blind decoding of sidelink control information (SCI), or information carried in SCI.

Multiple transmitter (Tx) WTRUs may be associated with a resource configuration group allowed at a receiver (Rx) WTRU.

An activation indicator may activate, deactivate, and/or change one or more activity and/or decoding behaviors configured at a WTRU. An activation indicator may enable one or more (e.g., a set) of configured activation behaviors. An activation indicator may be transmitted regularly and/or periodically in associated resources. An activation indicator may be transmitted upon activation of a session and/or activity behavior. A WTRU behavior with respect to a data space may be configured to conserve power. Multiple Tx WTRUs may use a common or dedicated activation space and dedicated data spaces.

An Rx WTRU may inform peer WTRUs of an activity behavior change. An Rx WTRU may send an activity change announcement to multiple peer WTRUs, for example, in a groupcast and/or a broadcast transmission.

An Rx WTRU may confirm an activity state change indication (e.g., an announcement). An Rx WTRU may confirm an activity state change indication (e.g., in groupcast).

A WTRU may determine its activities and/or behaviors based on suggested/configured activities and/or behaviors of a peer WTRU. The WTRU may be configured to have the same (e.g., substantially similar) activities and/or behaviors as the peer WTRU. The WTRU may be configured to use/may use a subset of the activity behavior configurations of the peer WTRU. The WTRU may be configured to use/may use a DRX configuration parameter that is a function of a DRX configuration parameter of the peer WTRU. The WTRU may be configured to use/may use a DRX configuration parameter that may be limited to a subset of values defined by a parameter value (e.g., the same parameter or a different parameter) of the peer WTRU. The WTRU and its peer(s) may determine and/or change the set of reception/transmission resources in a common DRX activity behavior/configuration.

A WTRU may select activity state configuration parameters (e.g., different activity state configuration parameters) based on different criteria. A WTRU may implement one or more triggers for sending a DRX configuration, an indication of DRX release, an indication of DRX enablement, and/or an indication of DRX disablement to a peer WTRU. A WTRU may determine the suitability of a DRX configuration suggested by a peer WTRU. A WTRU may trigger (e.g., implicitly) the enablement, disablement, and/or releasing of a DRX configuration.

A Tx WTRU may determine a priority to send (e.g., a priority associated with a DRX configuration group) to a peer Rx WTRU based on latency and/or loss of QoS incurred by the data transmissions by the TX WTRU respecting the associated configuration group.

Figure 2:
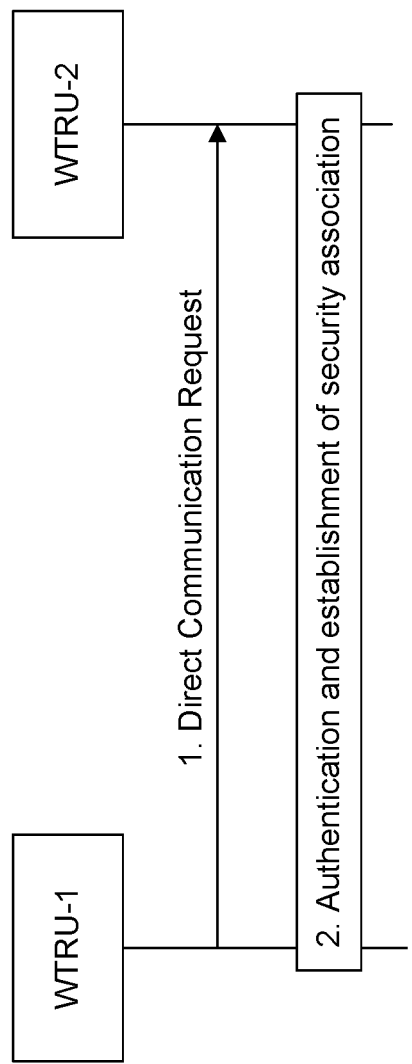
FIG. 2 is a diagram illustrating an example of establishment of a secure layer-2 link over PC5.

FIG. 2 is a diagram illustrating an example of establishment of a secure layer-2 link over PC5.

WTRUs engaged in one-to-one communication may negotiate PC5 QoS parameters, for example, during a link establishment procedure. WTRU-1 may send a Direct Communication Request message to WTRU-2, for example to trigger mutual authentication. The message may include requested PC5 QoS parameters. WTRU-2 may initiate mutual authentication. WTRU-2 may include the accepted PC5 QoS parameters in a Response message.

Discontinuous reception (DRX) may be implemented in NR Uu, e.g., for a WTRU in a CONNECTED mode. CONNECTED mode DRX may be specified for power savings in NR Uu, e.g., for a WTRU in RRC_CONNECTED. DRX may be based on a configured schedule of wake up times at the WTRU. A WTRU may remain awake for a certain time until no further scheduling is received, for example if the WTRU receives physical downlink control channel (PDCCH) scheduling during the WTRU's wakeup time. A WTRU may be configured, for example, with one or more of the following parameters: drx-onDurationTimer, drx-SlotOffset, drx-InactivityTimer, drx-RetransmissionTimerDL, drx-RetransmissionTimerU L, drx-LongCycleStartOffset, drx-ShortCycle, drx-ShortCycleTimer, drx-HARQ-RTT-TimerDL, or drx-HARQ-RTT-TimerUL.

Drx-onDurationTimer may be a duration (e.g., a duration of time) at the beginning of a DRX Cycle. Drx-SlotOffset may be a delay before starting a drx-onDurationTimer. Drx-InactivityTimer may be a duration (e.g., a duration of time) after a PDCCH occasion in which a PDCCH transmission indicates a uplink (UL) or downlink (DL) transmission for the medium access control (MAC) entity. Drx-RetransmissionTimerDL may be a maximum duration (e.g., a duration of time) until a DL retransmission is received. Drx-RetransmissionTimerDL may be per DL hybrid automatic repeat request (HARQ) process, e.g., except for the broadcast process. Drx-RetransmissionTimerUL may be a maximum duration (e.g., a duration of time) until a grant for a UL retransmission is received. Drx-RetransmissionTimerUL may be per UL HARQ process. Drx-LongCycleStartOffset may be a Long DRX cycle. Drx-ShortCycle may be a Short DRX cycle. Drx-StartOffset may define a subframe where a Long and/or a Short DRX Cycle starts. Drx- ShortCycleTimer may be a duration (e.g., a duration of time) that follows a Short DRX cycle. Drx-HARQ-RTT-TimerDL may be a minimum duration (e.g., a duration of time) before a DL assignment for a HARQ retransmission is expected by the WTRU, e.g., by a MAC functionality, a MAC entity, etc. Drx-HARQ-RTT-TimerDL may be per DL HARQ process, e.g., except for a broadcast process. Drx-HARQ-RTT-TimerUL may be a minimum duration (e.g., a duration of time) before a UL HARQ retransmission grant is expected by a the WTRU, e.g., by a MAC functionality, a MAC entity, etc. Drx-HARQ-RTT-TimerUL may be per UL HARQ process.

A WTRU configured with DRX may determine the WTRU's active time (e.g., the time when the WTRU actively monitors PDCCH).

Active time may include (e.g., if a DRX cycle is configured), for example, time that one or more of drx-onDurationTimer, drx-InactivityTimer, drx-RetransmissionTimerDL, drx-RetransmissionTimerUL, or ra-Contention ResolutionTimer (e.g., as described herein) is running.

Active time may (e.g., additionally or alternatively) include (e.g., if a DRX cycle is configured), for example, time while a Scheduling Request (e.g., sent via a PUCCH transmission) is pending (e.g., as described herein).

Active time may (e.g., additionally or alternatively) include (e.g., if a DRX cycle is configured), for example, time while a PDCCH transmission has not been received (e.g., a PDCCH transmission indicating a new transmission addressed with a cell radio network temporary identifier (C-RNTI) of a MAC entity has not been received after successful reception of a Random Access Response for a preamble not selected by the MAC entity (e.g., as described herein)).

Partial sensing and random selection may be implemented (e.g., in LTE V2X).

Partial sensing may be a power saving mechanism (e.g., for use by pedestrian WTRUs). A WTRU (e.g., with partial sensing) may be configured, for example, by upper layers, e.g., with a minimum number of candidate subframes in the resource selection window [T1, T2]. When referred to herein, a WTRU being configured by a network and/or upper layer(s) with certain parameters, behaviors, or information and/or a WIRY obtaining certain parameters, behaviors, or information from a network and/or upper layer(s) may include the WTRU determine the parameters, behaviors, or information based on configuration information received from the network (e.g., via one or more configuration messages such as one or more RRC messages, one or more PDCCH messages, DCI, etc.) and/or based on information determined by the WTRU (e.g., the WTRU may be preconfigured with the information and/or the WTRU may determine the information based on its own functionality, such as, but not limited to, higher layer functionality). When referred to herein, upper layers may include, but not limited to, one or more of a medium access control (MAC) layer, a radio link control (RLC) layer, a packet data convergence protocol (PDCP) layer, a radio resource control (RRC) layer, one or more application layers, etc. When referred to herein, a WTRU receiving or obtaining a configuration may include the WTRU receiving configuration information or the WTRU receiving configuration information indicating the configuration. When referred to herein, a WTRU suggesting, signaling, selecting, or providing a configuration may include the WTRU transmitting configuration information or the WTRU transmitting configuration information indicating the configuration.

Specific subframes may be selected, for example, by the WTRU. A WTRU may perform sensing on subframes (e.g., only on subframes) in the sensing window that are an integer number of reservation periods from candidate subframes, which may reduce the amount of resources the WTRU needs to perform sensing in the sensing window.

WTRUs (e.g., pedestrian WTRUs) may perform random selection on a resource pool. A WTRU may perform selection of resources (e.g., without considering any sensing results during the sensing procedure), for example, if a resource pool is configured for random selection.

Unicast and groupcast may be supported (e.g., in NR V2X). LTE V2X may be based on (e.g., may only support) broadcast transmissions. In examples, a L2 destination ID (e.g., each L2 destination ID) may be associated with a broadcast service. WTRUs (e.g., all WTRUs) interested in the broadcast service may monitor for transmissions to an associated L2 destination ID.

Unicast and groupcast may be supported (e.g., in NR V2X). In an example of unicast, a pair of WTRUs may (e.g., first) establish a PC5 RRC connection (e.g., using signaling at upper layer(s)). Access stratum (AS) layer parameters configured for a unicast link may be exchanged (e.g., using PC5-RRC), for example, if the connection is established. A unicast link may benefit from the use of link monitoring (e.g., detection of radio link failure (RLF)), HARQ feedback, channel state indicator (CSI) feedback, and/or power control, for example, to improve the efficiency of sidelink transmission/reception. Groupcast may consist of transmission to a group of WTRUs, for example, where the group is assigned a common L2 destination ID (e.g., associated with the group). Link establishment may not be performed for groupcast. Groupcast may benefit (e.g., at the AS layer) from the use of HARQ feedback (e.g., only HARQ feedback). In examples (e.g., of groupcast HARQ option 1), RX WTRUs (e.g., all RX WTRUs) may share the same HARQ feedback resource and may transmit (e.g., only transmit), for example, if a not acknowledged (NACK) is to be transmitted. In examples (e.g., of groupcast HARQ option 2), a RX WTRU (e.g., each RX WTRU) may have a feedback resource (e.g., independent feedback resource), e.g., determined by a member ID within the group. A RX WTRU may transmit ACK/NACK in the WTRU's feedback resource for a received groupcast transmission (e.g., each received groupcast transmission).

A WTRU may reduce its power consumption, for example, if (e.g., when) operating in a given frequency band using different optimizations, for example, in terms of transmission reception (e.g., decoding of control/data resources), in terms of time (e.g., by not receiving and/or decoding during certain symbols, slots, etc.), and/or in terms of frequency (e.g., by tuning to the smallest possible set of resources). Optimization(s) may be based on a transmission activity of a WTRU. In examples, a WTRU operating over a Uu interface may be configured with DRX for discontinuous reception of PDCCH transmission(s) (e.g., time), and/or may change an active bandwidth part (BWP) (e.g., frequency), and/or may change the number of active carriers, for example, if configured with carrier aggregation (e.g., frequency). Power savings mechanisms may be under the control of a gNB (e.g., for the Uu interface).

Optimization(s) to achieve power savings (e.g., for the sidelink channel) in the time domain may be related to selectively monitoring and decoding sidelink resources, e.g., in terms of slots. Optimization(s) (e.g., for the sidelink channel) in the frequency domain may be related to selectively monitoring and/or decoding sidelink resources, e.g., in terms of resource pools.

A distributed system may comprise a Sidelink channel where multiple WTRUs may be communicating with each other. WTRU activity behavior (e.g., on/sleep profile) may be synchronized (e.g., in a distributed system) in time and/or frequency between WTRUs, for example, regardless of whether broadcast, groupcast, and/or unicast may be used for transmissions. Synchronization may be applicable over Uu for a system supporting multicast and/or broadcast transmissions.

Systems, methods, and instrumentalities are described herein to enable synchronization between peer WTRUs in a distributed system (e.g., sidelink operation), for example, using aspects of control channel reception (e.g., physical sidelink (SL) control channel (PSCCH)) and/or SL resource selection.

Systems, methods, and instrumentalities are provided for sidelink (SL) discontinuous reception (DRX) of unicast and/or groupcast traffic.

An activity behavior in a WTRU may be associated with an aspect related to a WTRU transmission and/or reception behavior (e.g., in terms of time/frequency resources), for example, to save power. Associations (e.g., and power savings) may occur, for example, for periods of time when a WTRU may (e.g., may be expected to) monitor physical SL shared channel (PSSCH); a time, duration of time, timers, etc. and/or conditions related to transitions between monitoring and non-monitoring and associated behavior related to the transitions (e.g., change of Rx pool); a set of resources (e.g., resource pools) that may be monitored in a given activity state, etc.

Power savings may be achieved, for example, by powering front-end circuitry in a WTRU in the subchannels/slots (e.g., only in the subchannels/slots) when (e.g., time) and/or where (e.g., frequency) there may be transmission/reception related activity (e.g., expected transmission/reception related activity). Front-end circuitry may be powered off in other non-activity instances. In examples, a Tx WTRU (e.g., with data scheduled for transmission) and an Rx WTRU (e.g., with configured wake-up/sleep durations) may align their activity behavior with each other in a unicast link to satisfy transmission QoS requirements while achieving power savings. A WTRU may achieve power savings, for example, through reduction of decoding (e.g., reduced time/frequency resources, blind decoding attempts, etc.) while the front-end is powered on.

A WTRU may have multiple ongoing sessions. A session may comprise of, for example, one or more of the following: a unicast link; a PC5 RRC connection; an active groupcast session (e.g., a WTRU may be configured with a groupcast L2 ID for transmissions/reception, and/or may have group information configured at the WTRU from upper layers); a groupcast PC5-RRC connection; a PC5-RRC connection to a relay WTRU; a PC5-RRC connection to a WTRU whose traffic is being relayed; an upper layer service; or a specific activity behavior (e.g., a DRX configuration associated with an on duration, inactivity timer, etc.).

An ongoing session may correspond to a broadcast service (e.g., an L2 ID) that may be configured at the WTRU for transmission/reception.

A session may be identified, for example, by one or more of the following: a destination L2/L1 ID (e.g., being used by a Rx/Tx WTRU in reception/transmission); a pair of source/destination L2/L1 IDs; a member ID (e.g., for groupcast); a relay ID, or relay link ID (e.g., for relays); a unicast link ID (e.g., for multiple links between the same pair of WTRUs); or one or more priority values, e.g., or transmissions associated with one or more priorities.

For example, a unicast link represented by a PC5 RRC connection (e.g., a PC5 RRC connection identified by a source/destination L2 ID) may be an example of a session (e.g., as described in examples herein).

A DRX configuration may be provided for a unicast link. DRX may be configured (e.g., for a unicast link), for example, during link establishment/configuration signaling over PC5. In examples, a pair of WTRUs may exchange a configuration (e.g., any configuration) related to DRX as part of PC5-RRC signaling during link establishment and/or link configuration. A WTRU may trigger a reconfiguration signaling to reconfigure the sidelink activity behavior configuration, for example, if an associated factor (e.g., any of the associated factors) described below changes. The configuration may consist of, for example, timers, resource pools, patterns, etc. (e.g., as discussed herein and related to activity behavior).

An activity state configuration may be selected, for example, during link establishment. An activity state (e.g., DRX) configuration may be selected by a Tx WTRU and may be provided to an Rx WTRU (e.g., in a sidelink configuration message). An Rx WTRU may accept or reject the configuration and may send an accept/reject indication in a response message. A Tx WTRU may assume that an Rx WTRU does not perform an activity state behavior and the unicast link may still be established, for example, if an Rx WTRU rejects an activity state configuration. A Tx WTRU may implement a different activity state configuration, for example, in the case of rejection (e.g., in the case where an Rx WTRU rejects an activity state configuration). A Rx WTRU may perform (e.g., always perform) monitoring of sidelink according to a resource pool, for example, in the case when the Rx WTRU rejects an activity state configuration. An Rx WTRU may provide an alternative activity state configuration. In examples, an Rx WTRU may provide a selected activity state configuration (e.g., the Rx WTRU's selected activity state configuration), which may be provided to the Tx WTRU, for example, in a confirmation/acknowledgement of a sidelink configuration message. In examples, a Tx WTRU may select a subset of the allowable activity state configurations and send the selected subset to an Rx WTRU. The Rx WTRU (e.g., given this subset of activity state configurations) may select one or more of the activity state configurations and send the selected one or more activity state configurations (e.g., an indication of the one or more activity state configurations selected by the Rx WTRU) to the Tx WTRU. The Tx WTRU and/or the Rx WTRU may adhere to the selected activity state configuration(s) (e.g., following the exchange between the Tx WTRU and the Rx WTRU). A WTRU (e.g., Rx and/or Tx WTRU) may inform the network of the activity state configuration selected or provided by the peer WTRU.

A WTRU (e.g., Rx and/or Tx WTRU) may select one or more configurations to be provided to a peer WTRU and/or may accept or reject a configuration suggested and/or configured by a peer WTRU. The WTRU may do so, for example, based on one or more of the following: a configuration obtained from the network and/or from one or more upper layers, an association with quality of service (QoS) flows and/or sidelink radio bearers (SLRBs), an association with a L2 source and/or a destination ID, commonality of configurations associated with multiple peer WTRUs, an association with one or more sidelink (SL) measurements, one or more decision rules (e.g., if multiple configurations are associated), a combination of multiple configurations, a Uu configuration aspect, a WTRU type and/or link type; a WTRU location, or a dependence on a peer WTRU capability.

In examples of selecting an activity state configuration based on a configuration obtained from the network and/or one or more upper layers, a Tx and/or Rx WTRU may obtain an activity state configuration from the network, for example, during a unicast link establishment/configuration with a peer WTRU. A Tx WTRU may (e.g., prior to sending sidelink configuration message) receive an activity state configuration from the network, and may forward the configuration to the peer WTRU. An Rx WTRU may (e.g., upon receiving a sidelink configuration) request an activity state configuration from the network. The request may include, for example, one or more of the parameters (e.g., all or a subset of the parameters) received in the sidelink configuration message. A Tx and/or Rx WTRU may obtain an activity state configuration from one or more upper layers, for example, at the establishment of a unicast link. A WTRU (e.g., a Tx or Rx WTRU) may send such configuration to a peer WTRU, for example, during configuration of the AS layer parameters associated with the unicast link. A WTRU may obtain a set of activity state configurations from the network and/or one or more upper layers. A WTRU may select (e.g., further select), e.g., from the obtained set of activity state configurations provided by the network and/or the upper layers, one or more selected activity state configurations based on other criteria (e.g., one or more other parameters) described herein, where the term criteria may be associated with a singular or plural usage herein.

In examples of selecting an activity state configuration based on an association with QoS flows and/or SLRBs, a WTRU may be configured (e.g., by a system information block (SIB), dedicated signaling, a preconfiguration, or one or more upper layers) with one or more activity state configurations, for example, for a) QoS flow (e.g., each QoS flow) configured by upper layer and/or SLRB to be configured by the WTRU. A WTRU may determine an activity state configuration to be provided to a peer WTRU and/or to be used by the WTRU itself, for example, based on configured QoS flows and/or SLRBs. For example, a WTRU may be configured with an association between a QoS flow/SLRB and allowable (e.g., set of) activity state configuration(s) (e.g., a DRX parameter, an active state resource pool, etc.). A WTRU may be configured with one or more properties of an activity state configuration that are allowed or restricted (e.g., maximum/minimum value of an allowable DRX parameter). The WTRU may select a configuration for transmission via the PC5-RRC from the set of allowable configurations and/or from the set of configurations whose associated DRX configurations satisfy allowed or restricted parameters. In examples, a WTRU may provide activity state configurations (e.g., all activity state configurations) during RRC signaling and may change between one activity state configuration and another activity state configuration (e.g., dynamically, as described herein).

In examples of selecting an activity state configuration based on an association with an L2 source and/or destination ID, a WTRU may be configured (e.g., by one or more upper layers) with one or more activity state configurations and/or allowed or restricted parameters associated with an activity state configuration based on the L2 source and/or destination ID. The WTRU may (e.g., upon initiating a service, configuring a bearer associated with such L2 source and/or destination ID, and/or initiating a unicast link with such a pair of L2 source and destination ID) select the associated activity state configuration(s).

In examples of selecting an activity state configuration based on the commonality of configurations associated with different peer WTRUs, a WTRU may select one or more of a number of configurations that may result in the configurations (e.g., all configurations) active at the WTRU having the most commonality (e.g., the configurations may be associated with different unicast links). Commonality may be measured in terms of minimizing the number of resources monitored by a WTRU, for example, when the WTRU monitors resources according to multiple DRX configurations (e.g., each of such configurations may be associated with a different unicast link). For example, a WTRU may determine one or more acceptable configurations based on rules (e.g., based on QoS and/or SLRB), and may select a configuration from these one or more acceptable configurations based on their commonality. For example, a WTRU may be configured with a set of QoS flows and/or SLRB configurations for which a configuration is acceptable, and may determine the acceptable configuration(s) based on the established QoS flows and/or SLRBs. The WTRU may select the configuration for a unicast link (e.g., a specific unicast link) that maximizes the commonality among multiple unicast links (e.g., all unicast links) that the WTRU is involved with.

In examples of selecting an activity state configuration based on an association with one or more SL measurements, a WTRU may be configured with one or more allowable configurations for a given SL measurement (e.g., a channel busy ratio (CBR), a channel occupancy ratio (CR), a sidelink reference signal received power (SL RSRP), sideline channel state information (SL CSI), or a similar measurement.) For example, a WTRU may be configured with allowable configuration(s) for a given CBR or a range of CBR. For example, a WTRU may be configured to disable/enable DRX (or a DRX configuration), e.g., if the CBR is above/below a (pre)configured threshold (e.g., a configured or preconfigured threshold).

In examples of selecting an activity state configuration based on decision rules (e.g., if multiple configurations are associated) and/or a combination of multiple configurations, a WTRU may determine a common/single configuration from multiple independent activity state configurations (e.g., two independent activity state configurations), for example, based on preconfigured combination rules and/or a combination of configurations, and may determine/transmit (e.g., only) the common/single configuration e.g., if combination rules are satisfied. For example, a common configuration may comprise selecting one or more of the following: the lowest/highest value of a time, duration of time, timer, etc., the smallest/largest set of resources, the smallest/largest value of a period, the smallest/largest value of an offset, or the resource pool(s) that minimize/maximize the set of common/different set of subchannels, slots, etc. A WTRU may be configured with a set of QoS flows and/or SLRBs for which the associated activity state configurations can/cannot be combined using the rules.

In examples of selecting an activity state configuration based on a Uu configuration aspect, a WTRU may determine an activity state configuration for a unicast link based on the WTRU's Uu configuration, e.g., if the WTRU is in coverage and/or connected. For example, a WTRU may determine whether to configure an activity state and/or the allowable/selected configuration(s) that can be configured based on the WTRU's Uu configuration. A Uu configuration may be associated with any of the following: a Uu DRX configuration, a Uu traffic type and/or a dedicated radio bearer (DRB) configuration, or a Uu Multi-RAT Dual Connectivity (MR-DC) configuration.

In examples of a Uu configuration associated with a Uu DRX configuration, a WTRU may select a sidelink unicast activity state configuration, which may be aligned with a currently configured Uu DRX cycle (e.g., such that the active time on Uu may coincide with monitoring of the sidelink by the peer WTRU)) The WTRU may select a sidelink unicast activity state configuration that maximizes the commonality between the Uu and PC5.

In examples of a Uu configuration associated with a Uu traffic type and/or a DRB configuration, a WTRU may not provide a sidelink activity configuration (e.g., no sidelink DRX), for example, if configured with one or more Uu bearer types and/or traffic types.

In examples of a Uu configuration associated with a Uu MR-DC configuration, a WTRU may determine whether to provide a sidelink activity configuration, for example, depending on whether the WTRU is currently configured with MR-DC.

In examples of selecting an activity state configuration based on a WTRU type and/or a link type, a WTRU may determine whether to configure an activity state at a peer WTRU and/or the possible configuration, for example, based on the WTRU type and/or the link type. The WTRU type and/or the link type may be provided, for example, by an upper layer during/prior to link establishment. For example, a WTRU may be associated with a specific type (e.g., a relay WTRU, a remote WTRU, a vehicle WTRU, etc.) for which an activity state configuration and/or a subset of allowable activity state configurations may or may not be provided. Upper layers may provide an identification of a specific link (e.g., a relay link for WTRU to WTRU relay, a relay link for WTRU to network relay, and/or a multi-hop relay link). A WTRU may be configured with rules to provide or not provide an activity state configuration and/or a subset of allowable activity state configurations. An WTRU type and/or a link type may be provided by a peer WTRU (e.g., via a capability exchange, or via a previous message before/during unicast link establishment).

In examples of selecting an activity state configuration based on a WTRU Location, a WTRU may determine whether to configure a peer WTRU with an activity state configuration, or a configuration to use, for example, depending on a location (e.g., zone ID) of the WTRU or the peer WTRU. For example, a WTRU may be (pre)configured (e.g., configured or preconfigured) with restrictions/configurations for a particular location/zone ID and may provide the configuration associated with the location/zone ID (e.g., via PC5-RRC signaling).

In examples of selecting an activity state configuration based on a dependence on the capability of a WTRU and/or a peer WTRU, a WTRU may determine whether to configure a peer WTRU with an activity state configuration, or a configuration to use, for example, depending on whether a configuration is supported and/or which configuration is supported by a WTRU, e.g., as may be signaled via a sidelink capability exchange. A WTRU may determine whether to configure and/or suggest a configuration to a peer WTRU depending on whether the WTRU supports the configuration or a resulting set of configurations (e.g., in the case where the WTRU has multiple effective configurations, each of which may be associated with a respective unicast link), e.g., if such a configuration were to be activated, used, and/or enabled for DRX.

In examples of selecting an activity state configuration based on an association with a resource pool, a WTRU may be configured with one or more activity state configurations, one or more DRX configurations, and/or the like for the resource pool (e.g., for each resource pool associated with the WTRU). The WTRU may select one or more of the configurations from the configurations associated with a given Tx pool and/or a given Rx pool configured for the WTRU.

A WTRU may be configured to reject a configuration (e.g., a single configuration) suggested by a peer WTRU based on one or more criteria (e.g., one or more parameters), for example, similar to those used in the examples provided herein for selecting a configuration (e.g., from a set of allowable and/or configured configurations). For example, a first WTRU may select a configuration group from a set of configuration groups provided by a network or from a set of predefined configurations. The first WTRU may perform this selection based on the criteria described herein. The first WTRU may send and/or indicate the selected configuration group to a second WTRU, e.g., via a sidelink message (e.g., a PC5-RRC reconfiguration message). The second WTRU may evaluate the suitability of the selected configuration group (e.g., configuration(s) comprised in the configuration group) and may perform one or more of the following.

In examples (e.g., if the configuration(s) in the configuration group are suitable at the second WTRU), the second WTRU may confirm the use of the configuration(s) (e.g., by sending a configuration complete message, for example to the first WTRU). In examples (e.g., if the configuration(s) in the configuration group are not suitable at the second WTRU), the second WTRU may reject the configuration(s), for example, by sending a configuration failure message, for example to the first WTRU, and/or may indicate a reason for the rejection or configuration failure (e.g., a DRX configuration failure), for example, in the configuration failure message. The second WTRU may indicate (e.g., in the configuration failure message) why the configuration failed, such as which condition (e.g., a condition associated with the decision criteria described herein) was not met. Following a configuration failure between a first WTRU and a second WTRU, one or more of the following may occur. The first and second WTRUs may continue to operate (e.g., communicate) without DRX on a unicast link. In examples, the first and second WTRUs may continue to operate (e.g., communicate) via the unicast link by using a previous DRX configuration (e.g., a previous DRX configuration that was active or used, etc). A unicast link may be torn down (e.g., following a configuration failure). The first WTRU may select an alternate configuration and repeat the configuration process (e.g., following a configuration failure). The first and/or second WTRU may fallback to a default DRX configuration, e.g., a configuration associated with groupcast and/or broadcast, or a (pre)configured default configuration (e.g., following a configuration failure). In examples (e.g., if the configuration(s) are not suitable at the second WTRU), the second WTRU may select a configuration and send or indicate the selected configuration to the first WTRU (e.g., via a configuration failure message).

A WTRU may enabled or disable a configuration, for example, if the configuration is agreed (e.g., by the WTRU and a peer WTRU) for a unicast link. The WTRU may release the configuration. The WTRU may enable or disable the configuration, for example, via signaling (e.g., explicit signaling), as described herein. The WTRU may release the configuration, for example, as a result of an event (e.g., any event) described herein.

A WTRU may be configured to determine its activities and/or behaviors based on suggested/configured activities and/or behaviors of a peer WTRU. A WTRU (e.g., each WTRU) in a unicast link may be a Tx WTRU or an Rx WTRU. An activity behavior of a WTRU may be associated with the periods of time/resources in which the WTRU (e.g., an Rx WTRU) monitors a sidelink. A WTRU (e.g. a Tx WTRU) may perform transmission based on the activity behavior of its peer WTRU (e.g., an Rx WTRU). Configuring activities and/or behaviors independently for the two WTRUs (e.g., two peer WTRUs) may result in inefficient power savings for a WTRU (e.g., a given WTRU), for example, if both Tx and Rx behaviors are considered. For example, the inefficiency may result from a Tx WTRU turning on an RF-front end, e.g., if the Tx WTRU wants to transmit information (e.g., according to the activity behavior of a peer WTRU). The inefficiency may result from a Tx WTRU turning on the RF-front end, e.g., if the Tx WTRU is expected to receive information (e.g., from a peer WTRU).

A WTRU may be configured to determine its activities and/or behaviors (e.g., its DRX configurations) based on (e.g., as a function of) the activities and/or behaviors (e.g., one or more DRX configurations) of a peer WTRU. In examples, a WTRU may receive an indication of the activities and/or behaviors (e.g., Rx activities and/or behaviors) associated with a peer WTRU (e.g., via PC5 RRC signaling), and may derive and/or determine its own activities and/or behaviors (e.g., Rx activities and/or behaviors) accordingly (e.g., based on the received indication). In examples, a WTRU (e.g., a Rx WTRU) may receive an indication of its activities and/or behaviors (e.g., Rx activities and/or behaviors) that the WTRU should have from a peer WTRU (e.g., via a DRX suggestion), and may determine the activities and/or behaviors (e.g., Rx activities and/or behaviors) for the peer WTRU based on the WTRU's own activities and/or behaviors (e.g., as received from the peer WTRU). The WTRU (e.g., a Rx WTRU) may send an indication/suggestion of the determined activities and/or behaviors to the peer WTRU. One or more of the following techniques may be deployed by the WTRU to determine the activities and/or behaviors of the WTRU and/or a peer WTRU.

A WTRU may be configured to have the same (e.g., substantially similar) activities and/or behaviors (e.g., configurations) as a peer WTRU. In examples, the WTRU may determine its activities and/or behaviors (e.g., directly) from the activities and/or behaviors selected, suggested, and/or signaled by a peer WTRU. These activities and/or behaviors may include, for example, the WTRU's Rx activities and/or behaviors (e.g., the full DRX configuration of the WTRU, the pattern of slots to be monitored by the WTRU, a set of times, durations of time, timers, etc. related to DRX, etc.), and the WTRU may determine these activities and/or behaviors based on activities and/or behaviors (e.g., Rx activities and/or behaviors) selected and/or to be used by the peer WTRU. For example, a first WTRU may select an Rx activity behavior (e.g., based on an SLRB configuration and/or another configuration received from a peer WTRU). The first WTRU may send/indicate the Rx activity behavior to the peer WTRU. The peer WTRU may operate with the same (e.g., substantially similar) activity behavior selected/indicated by the first WTRU. In examples, the first WTRU may send/indicate multiple potential activities and/or behaviors (e.g., which may be selected as described herein) to a peer WTRU. The peer WTRU may select one or more of the potential activities and/or behaviors of the first WTRU (e.g., as described herein), and implement the selected one more activities and/or behaviors in the peer WTRU's operation (e.g., for Rx monitoring). The peer WTRU may send/indicate the activities and/or behaviors selected by the peer WTRU to the first WTRU. The first WTRU may implement the selected activities and/or behaviors (e.g., as indicated by the peer WTRU) in the first WTRU's operation, for example, for RX monitoring.

A WTRU may be configured to use a subset of the activities and/or behaviors (e.g., configurations) of a peer WTRU. The WTRU may determine its activities and/or behaviors based on a subset of the configurations selected/signaled by a peer WTRU. The WTRU may determine one or more parameters associated with the WTRU's Rx activities and/or behaviors (e.g., a DRX cycle or periodicity, a DRX offset, etc.) based on parameter(s) used/selected by a peer WTRU for its own Rx activities and/or behaviors. For example, the WTRU may set parameters such as a DRX cycle (e.g., a DRX periodicity), and/or an offset (e.g., a starting SFN or slot) to be the DRX cycle (e.g., the DRX periodicity), and/or offset selected/signaled by a peer WTRU for the peer WTRU's own Rx activities and/or behaviors. The WTRU may determine other DRX configuration parameters (e.g., on duration, inactivity time/duration of time/timer, etc.) independently (e.g., not based on the parameters of a peer WTRU) or based on other mechanisms/options described herein.

A WTRU may be configured to determine its activities and/or behaviors (e.g., a DRX configuration parameter) as a function of a peer WTRU's activities and/or behaviors (e.g., a DRX configuration parameter of the peer WTRU). For example, the WTRU may determine the values of its DRX configuration parameters (e.g., which may be associated with Rx monitoring behavior) based on the values of (e.g., set to the same values as) DRX configuration parameters used by a peer WTRU in its Rx monitoring operations (e.g. Rx monitoring behaviors). The WTRU may, for example, set its DRX cycle to be an integer multiple of the peer WTRU's DRX cycle (e.g., or vice versa), set a DRX on duration and/or the number of resources to be monitored to a value larger than or smaller than the DRX on duration and/or the number of resources to be monitored of the peer WTRU (e.g., subject to a limitation on the amount above or under), set a DRX offset to a value larger or smaller than a DRX offset of the peer WTRU (e.g., the WTRU may select its DRX on duration so that it is non-overlapping with but adjacent in time to the DRX on duration of the peer WTRU), etc.

A WTRU may be configured to limit a configuration parameter (e.g., a DRX configuration parameter) to values (e.g., to a subset of the values) defined by a peer WTRU for the same parameter or a different parameter. For example, the WTRU may determine the value of a DRX configuration parameter (e.g., which may be associated with RX monitoring) based on a subset of allowable values defined, determined, and/or configured by a peer WTRU (e.g., based on the value selected by a peer WTRU). For example, the WTRU may be (pre)configured (e.g., configured or preconfigured) with a subset of allowable DRX cycles (e.g., allowable DRX periodicities) selected by a peer WTRU (e.g., used by the peer WTRU in its own DRX operation). The subset of allowable values may depend on other factors described herein (e.g., WTRU capability, QoS, SL measurements, etc.).

A WTRU and/or its peer(s) (e.g., its peer WTRU(s)) may be configured to determine and/or change reception and/or transmission resources (e.g. a set of reception and/or transmission resources) based on a common activity, behavior, and/or configuration (e.g., a DRX activity, behavior, and/or configuration) between the WTRU and its peer(s) (e.g., its peer WTRU(s)). For example, two peer WTRUs may define a common activity behavior associated with transmission and/or reception (e.g., a common DRX configuration defining Rx activities or behaviors for one of the WTRUs). The peer WTRUs may divide (e.g, further divide) the resources associated with the common configuration, for example, as Rx resources used by a first WTRU, Rx resources used by a second WTRU, etc. A WTRU may be limited to transmitting to a peer WTRU using (e.g., only using) the Rx resources associated with the peer WTRU. For example, a common on duration (e.g., a common DRX on duration) may be defined for a first WTRU and a second WTRU (e.g., for two peer WTRUs) involved in a unicast link (e.g., using any of the techniques described herein), and either WTRU (e.g., each WTRU) may be allocated a set of Rx resources within the on duration (e.g., the contiguous on duration). The first WTRU may perform reception, e.g., associated with the unicast link, using (e.g., only using) the Rx resources allocated to the first WTRU. The first WTRU may perform transmission, e.g., associated with the unicast link, using (e.g., only using) the Rx resources allocated to the second WTRU (e.g., the peer WTRU). This may allow the first WTRU and/or the second WTRU to avoid half-duplex (e.g., collision between transmission and reception) given the limited time in which the peer WTRUs are actively monitoring a sidelink (e.g., the unicast link between the first and second WTRUs).

A WTRU may be configured to determine Rx/Tx resources associated with a common DRX configuration (e.g., a common DRX configuration between the WTRU and a peer WTRU), for example, statically (e.g., in response to (re)configuration of a unicast link by the WTRU or the peer WTRU). For example, the WTRU may determine a set of Tx/Rx resources for itself and/or a peer WTRU, and send/indicate the resources via sidelink messaging (e.g., sidelink configuration messaging). The WTRU may change/determine its Rx/Tx resources dynamically, for example, through signaling with a peer WTRU.

A WTRU may determine a set of resources (e.g., including the partition/pattern of Tx/Rx) based on one or more allowable, (pre)configured (e.g., configured or preconfigured), and/or predetermined configurations. These configurations may be selected by the WTRU based on one or more of the following. The WTRU may select the configurations based on QoS, a SLRB configuration, and/or one or more established QoS flows. For example, the WTRU may select a Tx/Rx partition/pattern based on established SLRBs and/or established QoS flows of the WTRU and/or a peer WTRU(s). The WTRU may select the configurations based on a resource pool configuration. For example, the WTRU may be configured with one or more allowable partitions/patterns for the resource pool(s) that the WTRU may utilize (e.g., currently utilize). The WTRU may select the configurations based on an L2 ID and/or a service associated with the WTRU and/or peer WTRU(s). The WTRU may select the configurations based on HARQ feedback timeline. For example, the WTRU may determine one or more allowable Tx slots based on slots associated with a physical sidelink feedback channel (PSFCH) on which the WTRU is configured to perform Rx (e.g., the WTRU may determine the allowable Rx slots as the PSFCH slots corresponding to slots in which a peer WTRU is configured to perform Rx). The WTRU may select the configurations based on the WTRU's data load and/or the amount of data in the WTRU's buffers that is available for transmission. For example, the WTRU may select a Tx/Rx partition/pattern based on the amount of data in the WTRU's buffers available for transmission (e.g., at the start of a DRX cycle, during an on duration, at the expiry of a time, duration of time, timer, etc. or at other time(s) during the WTRU's RX activities or behaviors associated with a unicast link). The WTRU may change or request a change in a partition, for example, as a result of an increase or decrease in the WTRU's data load or amount of buffered data.

A WTRU may be configured to select different activity state configuration parameters based on different criteria. The WTRU may select different parameters associated with an activity state configuration based on different criteria and/or using different methods (e.g., described further herein) The WTRU may use the criteria and/or methods to determine the suitability of a given parameter of a DRX configuration, as discussed herein. For example, the WTRU may determine a DRX cycle, a periodicity of an activity, and/or similar parameters based on a first criteria, and may determine an active time, a duration of an activity, and/or similar parameters based on a second criteria.

A WTRU may select a DRX cycle based on one or more L2 IDs associated with a unicast link and/or based on QoS criteria. A WTRU may determine an active period and/or an inactivity time/duration of time/timer based on measurements of CBR/CR/RSRP and/or similar sidelink measurements, for example, in response to the WTRU selecting a DRX cycle.

A WTRU may be configured with one or more allowable DRX cycles, for example, by an upper layer (e.g., the allowable DRX cycles may be associated with one or more established QoS flows). The WTRU may be configured, e.g., by a network, with one or more allowable on durations (e.g., allowable active periods) per DRX cycle, which may further depend on criteria (e.g., other criteria) described herein.

A WTRU may be configured with one or more triggers for sending a DRX configuration to a peer WTRU and/or for sending an indication to the peer WTRU to release DRX, enable DRX, and/or disable DRX. For example, a first WTRU (e.g., a first Tx or RX×WTRU) may send a DRX configuration (e.g., a suggested configuration, a selected configuration, etc.), an indication or request to release a currently active DRX configuration, an indication or request to disable or enable a currently configured DRX configuration, and/or the like to a peer WTRU based on one or more of the following triggers.

The triggers may include a trigger associated with cell mobility. For example, the trigger may be associated with a handover (HO), a cell reselection, and/or a change of coverage state (e.g., from in-coverage to out-of-coverage or vice versa). A WTRU may send a configuration (e.g., to a peer WTRU) in the case where cell mobility results in a change in the allowable configurations at the WTRU, and the current configuration is not one of allowable configurations (e.g., given the WTRU's current set of bearer(s), L2 ID(s), etc.).

The triggers may include a trigger associated with bearer establishment, bearer reconfiguration, and/or bearer release with a peer WTRU. For example, the trigger may be associated with a WTRU triggering a bearer establishment, a bearer reconfiguration, a bearer release, or upon the WTRU completing (e.g., successfully completing) these operations. A WTRU may send a configuration (e.g., to a peer WTRU), for example, if one or more trigger(s) result in allowing DRX and/or in changing allowed DRX. For example, a SLRB reconfiguration may result in creating/releasing a restriction on the suitability of a DRX configuration, e.g., which may trigger transmission of a DRX configuration. For example, if a unicast link currently does not have DRX configured and/or a bearer (e.g., a bearer that did not allow DRX while the bearer is established) is released, a WTRU may send a DRX (re)configuration (e.g., to a peer WTRU) and/or may trigger DRX to be enabled (e.g., at the peer WTRU). For example, if a new QoS flow established results in the establishment of a new SLRB, a WTRU may send a configuration (e.g. request a change in the configuration) or may request that a currently configured active configuration be released. Such decisions may be based on QoS and/or SLRB configuration(s), as described herein.

The triggers may include a trigger associated with bearer establishment, bearer reconfiguration, bearer release, and/or a DRX configuration change with another WTRU. The trigger may be associated with a similar bearer event associated with another WTRU and/or upon a change in DRX configuration with another WTRU. A decision to send a configuration may be based on the compatibility of multiple active/enabled configurations, as described herein.

The triggers may include a trigger associated with reception of capability information and/or capability change from a peer WTRU. The capability information and/or capability change may make a corresponding DRX configuration valid or invalid at the WTRU and/or the peer WTRU.

The triggers may include a trigger associated with a change of a WTRU's capability. The WTRU may receive an indication of its capability change (e.g., from upper layers). The capability change may be related to a change in an allowable power savings configuration, an allowable amount of power consumption, and/or the like.

The triggers may include a trigger associated with a change in SL measurements (e.g., CBR measurements, SL RSRP, SL CSI, etc.) on which a configuration is dependent, as described herein.

The triggers may include a trigger associated with WTRU type/category. For example, a WTRU may be configured with a specific type/category (e.g., in addition to other criteria defined herein) that may allow or disallow transmission of a DRX configuration.

The triggers may include a trigger associated with the presence of other unicast links, e.g., which may be configured with DRX. A WTRU may transmit a DRX configuration and/or a DRX suggestion to a peer WTRU, for example, during or following link establishment with the peer WTRU, based on whether the WTRU has one or more unicast links with other WTRUs and/or whether such unicast links are configured with DRX, based on the priority associated with the one or more unicast links, e.g., where priority may be determined, as described herein. For example, the WTRU may send a DRX configuration and/or suggestion, e.g., if the number of unicast links, the number of SLRBs, and/or the number of active QoS flows with other peer WTRU(s) is above a threshold. The WTRU may send a DRX configuration and/or suggestion, for example, if the number of unicast links with other peer WTRU(s) (e.g., unicast links configured with DRX) is above a threshold. The WTRU may send a DRX configuration and/or suggestion, for example, if there is one or more unicast links with other peer WTRU(s) with a priority above a threshold. The WTRU may send a DRX configuration and/or suggestion, for example, if a function of the priorities (e.g., an average of the priorities) of the unicast link(s) with peer WTRU(s) (e.g., all unicast links with peer WTRU(s) configured with DRX) is above a threshold.

The triggers may include a trigger associated with reception/non-reception of a DRX configuration from a peer WTRU and/or corresponding suitability of the DRX configuration. Such a trigger may cause a WTRU to transmit a DRX configuration. Such a trigger may be considered as one or more conditions for a WTRU to reject a DRX configuration upon its reception from a peer WTRU. A WTRU may send a DRX configuration to a peer WTRU, e.g., if the WTRU receives a configuration (e.g., an SLRB configuration or another configuration) from the peer WTRU that does not include a DRX configuration. A WTRU may select and/or determine a DRX configuration, e.g., if a peer WTRU (e.g., based on the rules described herein) decides not to select or transmit a DRX configuration.

A WTRU may determine the suitability of suggested DRX configuration(s) from a peer WTRU. The WTRU may send a DRX configuration to the peer WTRU, for example, if the WTRU receives a configuration from the peer WTRU that does not meet criteria (e.g., one or more parameters) defined at the receiving WTRU for the suitability of such a configuration. The WTRU may reject a suggested DRX configuration from the peer WTRU, for example, if the configuration is not suitable for the receiving WTRU. The WTRU may select one or more of a number of suggested DRX configurations sent by the peer WTRU based on suitability criteria. A Tx WTRU may select one or more of a number of (pre)configured DRX configurations to send to a peer WTRU based on the suitability criteria.

The suitability described herein may be (e.g., may be determined as) a function of a number of monitored resources and/or a pattern of the monitored resources. For example, a DRX configuration may be considered not suitable if it results in the monitoring, by a receiving WTRU, of a number of resources (e.g., in combination with resources monitored for other unicast links with other WTRUs) that exceed a (pre)configured or threshold (e.g., a (pre)configured or pre-defined maximum threshold). A DRX configuration may be considered not suitable, for example, if one or more resources that a receiving WTRU is expected to or not expected to monitor (e.g., in association with a PSCCH transmission) results in a conflict with another resource or set of resources (e.g., Uu resources defined as reception resources, SL resources defined as Tx resources, etc.). A DRX configuration or configuration group may be considered not suitable, for example, if adopting the DRX configuration or configuration group results in a WTRU exceeding an allowed number of configurations or configuration groups at the WTRU. The allowed number may depend on, for example, upper layer configuration, L2 ID, QoS flow/bearer configuration, CBR/CR/RSRP measurement, a current amount of data in the WTRU's buffers for transmission, and/or the like.

The suitability described herein may be (e.g., may be determined as) a function of the configured WTRU's capability. For example, a received DRX configuration may be considered not suitable if adopting the received DRX configuration results in a number of monitored resources exceeding the maximum number of monitored resources, based on the WTRU's capability and/or configuration.

The suitability described herein may be (e.g., may be determined as) a function of the amount of RX and TX resources that overlap at a WTRU. For example, a received DRX configuration may be considered not suitable if adopting the received DRX configuration results in the WTRU exceeding a maximum number of resources with which the WTRU is expected to be able to transmit and receive at the same time (e.g., while in an active time). Such a maximum number of resources may depend on one or more of the following (e.g., with respect to the link to which the DRX configuration is associated, and/or other ongoing links/WTRUs that may have DRX configured): an upper layer configuration, an L2 ID, a QoS flow/bearer configuration, a CBR/CR/RSRP measurement, a current amount of data in the WTRU's buffers for transmission, or the like.

The suitability described herein may be (e.g., may be determined as) a function of the number of peer WTRUs and/or unicast links a given WTRU has been configured with (e.g., in association with a DRX). For example, a received DRX configuration may be considered not suitable if adopting the received DRX configuration results in the number of peer WTRUs for which DRX is enabled being exceeded at the receiving WTRU.

The suitability described herein may be (e.g., may be determined as) a function of the commonality of a suggested DRX configuration with one or more configured DRX configurations (e.g., already configured DRX configurations). The commonality may be measured as a difference in one or more parameters associated with the DRX configurations, and/or whether the values of one or more parameters are a function of corresponding parameters in another configuration. For example, a configuration may be suitable if the difference in an offset (e.g., a DRX offset) is less than a threshold (e.g., such a threshold may be dependent on the WTRU's capability). A configuration may be suitable, for example, if a DRX cycle (e.g., comprised in the configuration) is a function (e.g., a multiple) of the DRX cycle for one or more other configurations.

The suitability described herein may be (e.g., may be determined as) a function of the time between any two events and/or resources associated with a DRX configuration and/or configuration group. For example, a WTRU may determine whether a configuration group and/or DRX configuration is suitable based on the difference between a resource in the DRX configuration and a resource in another DRX configuration (e.g., the configuration group and/or DRX configuration may be considered suitable if the difference is below a (pre)configured threshold).

The suitability described herein may be (e.g., may be determined as) a function of a QoS configuration, a SLRB configuration, and/or QoS flow(s) configured at a WTRU (e.g., at either WTRU). The QoS configuration, SLRB configuration, and/or QoS flow(s) may be associated with a unicast link between the WTRU and a peer WTRU, or may be associated with a different link (e.g., unicast link) and/or session (e.g., a unicast, groupcast, or broadcast session). For example, a DRX configuration (e.g., a specific DRX configuration) may be considered unsuitable for a given SLRB configuration. A WTRU may be configured with a set of DRX configurations and/or configuration groups that may be suitable for a given SLRB configuration. A WTRU, e.g., when receiving a DRX configuration or configuration group from a peer WTRU may determine whether such DRX configuration and/or configuration group is allowable based on whether such DRX configuration has been configured as being allowable for an SLRB of the WTRU (e.g., for any of the WTRU's established SLRBs). The SLRB may be associated with the same peer WTRU, with another peer WTRU, or with groupcast and/or broadcast transmissions/receptions for which the WTRU is interested. A WTRU may be configured with a set of allowable or non-allowable DRX configurations and/or configuration groups based on a combination (e.g., any combination) of SLRB configurations that may be active for transmission/reception at that WTRU.

The suitability of a configuration may be determined based on a combination (e.g., any combination) of the criteria described herein. For example, a WTRU may apply a first criteria to determine the suitability of a DRX configuration and define a threshold associated with the determination based on a second criteria. A WTRU may determine the suitability of a DRX configuration based on multiple criteria (e.g., multiple parameters) being satisfied.

A WTRU may be configured with triggers for enabling, disabling, or releasing (e.g., implicitly enabling, disabling, or releasing) a DRX configuration. The WTRU may utilize triggers similar to those described herein to enable or disable (e.g., implicitly enable or disable) a DRX configuration (e.g., without explicitly signaling the enablement or disablement to a peer WTRU). The WTRU may utilize triggers similar to those described herein to release a DRX configuration (e.g., a configured DRX configuration).

A WTRU may disable (e.g., implicitly disable) a DRX configuration (e.g., operate in a non-DRX mode where the WTRU may monitor a PSCCH in a continuous manner, e.g., at all times), for example, in response to a QoS flow being established, whereby the QoS flow may be indicated (e.g., by a network or a higher layer) as being associated with a non-DRX mode (e.g., having DRX disabled). A WTRU may disable (e.g., implicitly disable) a DRX configuration in response to the WTRU establishing an SLRB (e.g., a new SLRB), where the SLRB may be configured with a non-DRX mode (e.g., having DRX disabled). A WTRU may disable (e.g., implicitly disable) a DRX configuration, e.g., if the WTRU releases an SLRB configured to have DRX disabled and/or no other configured SLRBs have DRX disabled. For example, the WTRU may enable DRX upon release of an SLRB resulting from an indication from an upper layer, an indication from a peer WTRU, an RLF determination at the WTRU, and/or other events that cause the release of the SLRB.

A WTRU may disable (e.g., implicitly disable) a DRX configuration in response to creation, e.g., by a peer WTRU, of a SLRB for which DRX is to be disabled. A WTRU may disable the DRX configuration in response to reception of one or more parameters (e.g., RX-related parameters) of the DRX configuration. A WTRU may enable a DRX configuration in response to release of a peer WTRU's SLRB, for example, if the SLRB is configured with DRX disabled, if the peer WTRU has no other configured SLRBs that have DRX disabled (e.g., or require the DRX to be disabled), etc.

A WTRU may enable or disable DRX (e.g., implicitly enable or disable) upon a change in the measured/reported SL CBR, RSRP and/or CQI associated with one or more peer unicast WTRUs, and/or upon reception of such measurement by a peer WTRU. In either case, the WTRU may implicitly enable or disable the DRX configuration, e.g., if the measurement is above or below a configured threshold. In either case, the WTRU may implicitly enable or disable the DRX configuration, e.g, if the measurement changes by a certain amount.

Activity behavior may be configured in the context of multiple unicast and/or groupcast links.

In examples (e.g., where a WTRU has multiple sessions ongoing), each of the sessions may be configured with an independent activity behavior for the WTRU and (e.g., consequently) independent transmission opportunities for the Tx WTRUs. An Rx WTRU may (e.g., to reliably receive data over multiple sessions having independent activity behavior) combine the activity behaviors over multiple active unicast links (e.g., all active unicast links), for example, to derive a unified Rx activity behavior that may be aligned and/or synchronized with multiple associated Tx WTRUs (e.g., all associated Tx WTRUs). A combined DRX profile may allow support for different sidelink processes. A combined DRX profile may reduce power savings achieved when supporting sidelink processes with different traffic characteristics (e.g., non-periodic, bursty, etc.), for example, if the WTRU needs to perform sidelink monitoring at the times/resources associated with the union of each of the activity behaviors of the ongoing sessions.

A WTRU may monitor sidelink (e.g., independently monitor sidelink only) for the activity behavior of an active session (e.g., each active session).

In examples, a WTRU may perform active behavior (e.g., Tx/Rx) on a given time/frequency resource for session(s) (e.g., only for session(s)) that are active, as may be determined by the activity behavior of each session. For example, an Rx WTRU may be configured with a set of resources for reception (e.g., a resource pool) and/or with an Rx activity behavior for one or more links/sessions (e.g., L2 IDs, unicast/groupcast link, etc.). A WTRU may perform PSCCH monitoring for the resource pool associated (e.g., associated only) with the session(s) that are active (e.g., based on RX activity behavior). An Rx WTRU may use the activity behavior to determine the resource pool to monitor for the presence of sidelink control information (SCI) and data (e.g., for a certain on-duration), for example, if the Rx activity behaviors (e.g., each of the Rx activity behaviors) represent the schedule when the session may become active or non-active.

A WTRU may maintain an activity behavior (e.g., an independent activity behavior) for each of multiple sessions, for example, where the inactivity behavior of one session may not affect the inactivity behavior of another session. For example, each of multiple sessions may have a (e.g., separate or independent) set of times, durations of times, timers, counters, etc., for example, with respect to DRX-like behavior. For example, a session (e.g., each session) may be associated with a separate or independent on-duration, inactivity time, duration of time, timer, etc. For example, reception of data for a first session may reset a counter/timer associated with the first session without affecting a counter/timer associated with a second session. For example, a counter for the number of time/frequency resources to be monitored by a WTRU before transitioning to DRX may count the number of time/frequency resources associated (e.g., associated only) with the resource pool configured for a session.

Systems, methods, and instrumentalities are described herein in support of a WTRU achieving a power savings benefit, for example, by monitoring a session (e.g., independently monitoring one session) for a given time/resource. Sessions may be associated with a different monitoring behavior, for example, in terms of: time and/or frequency resources, a property associated with blind decoding of SCI, or information carried in SCI.

Monitoring behavior may vary based on time and/or frequency resources, such as separate sets of time/frequency resources. For example, a resource pool may be configured for one or more sessions. A WTRU may monitor a resource pool for one or more sessions (e.g., that may be active at a given time). In examples, a session may be configured with a set and/or a number of subchannels where a (e.g., first non-active time) transmission may occur. A WTRU may monitor a set of subchannels associated with the active session(s) (e.g., only the active session(s)), e.g., at a given time and/or within a given resource pool.

Monitoring behavior may vary based on a property associated with blind decoding of SCI (e.g., SCI format, scrambling, coding, a cyclic redundancy check (CRC) associated with SCI decoding, search space, and/or other decoding property of SCI).

For example, a session may be configured with a different SCI format. A WTRU may monitor for the SCI format(s) associated with active sessions, e.g., as may be determined by activity behavior. For example, a session may be configured with a different format of SCI2 (e.g., second stage SCI). SCI1 (e.g., first stage SCI) may indicate the SCI format of SCI2. A WTRU may decode SCI2, for example, if SCI1 indicates an SCI format for SCI2 that is associated with an active session.

For example, a session may be associated with a different scrambling, coding, and/or CRC (e.g., associated with SCI decoding). A WTRU may assume scrambling, coding, and/or CRC are associated with one or more active sessions (e.g., only one or more active sessions).

For example, a session may be associated with a different search space and/or other property for decoding SCI. A WTRU may perform decoding of the search space associated with the active session (e.g., only the active session).

Monitoring behavior may vary based on information carried in SCI. An indication in SCI may be explicit, for example. For example, a session may be configured with a specific index and/or identifier transmitted in SCI1. The index may identify a session or group of sessions. A WTRU may decode SCI2, for example, if SCI1 includes the index of a session that is active for the time/frequency resource in which SCI1 is decoded.

Multiple Tx WTRUs may be associated with a resource configuration group allowed at an Rx WTRU. In examples, configuring independent DRX behavior for each Tx WTRU (e.g., and for each session associated with the Tx WTRUs) may not translate into significant power savings, for example, if multiple Tx WTRUs transmit to an Rx WTRU. An Rx WTRU may frequently monitor multiple unrelated (e.g., in time/frequency) and/or uncorrelated time-slots/resource pools for the presence of activity associated with each configured session/Tx WTRU.

A Tx WTRU may be associated with a configuration group to use, for example, if transmitting to an Rx WTRU. In one or more of the examples provided herein, a configuration group may be used interchangeably with an activity state configuration referred to herein. A configuration group may comprise one or more resource pools, one or more sets of time-slots, and/or one or more sets of subchannels within a resource pool. A configuration group may be associated with an index or a similar identifier. A WTRU may determine the resource pools, the one or more sets of time-slots, and/or the one or more sets of subchannels, for example, by mapping to a configuration group. The mapping may be (pre)configured (e.g., configured or preconfigured) and/or predefined. An Rx WTRU may be configured with multiple configuration groups. A (e.g., each) configuration group may be associated with an index value or an identifier (e.g., a configuration group ID). A Tx WTRU that establishes a unicast link with an Rx WTRU may be assigned a configuration group index. A granularity for associating a configuration group may be, for example, per WTRU, per session/L2 ID (e.g., a source and/or destination L2 ID), and/or per logical channel (LCH). Multiple Tx WTRUs communicating with the same Rx WTRU may be associated with a common configuration group index, which may reduce the overall decoding burden of the Rx WTRU.

A WTRU may receive a configuration group or a set of configuration groups from the network, for example, via dedicated signaling (e.g., for an RRC connected scenario), indicated in a System Information Block (SIB) (e.g., for an RRC Idle/Inactive scenario), and/or the WTRU may be preconfigured (e.g., for an out of coverage scenario). A WTRU may determine a configuration group or set of configuration groups based on coordination with a peer WTRU (e.g., during unicast link (re)configuration). For example, a first Tx and/or Rx WTRU may select a resource pool from the configuration group coordinated during sidelink configuration of the unicast link. The Tx and/or Rx WTRU (e.g., the first Tx and/or Rx WTRU) may use the same configuration group for coordination with a second Rx and/or Tx WTRU during a link (re)configuration.

In examples, the indices of configuration groups allowed in an Rx WTRU may be indicated to a Tx WTRU, e.g., during a unicast link (re)configuration. A Tx WTRU may determine one or more suitable configuration groups, for example, based on a criterion (e.g., a parameter), which may include matching with the transmission characteristics (e.g., traffic profile, priority, QoS, and/or another criterion defined herein). A Tx WTRU may send to an Rx WTRU, for example, the selected one or more configuration group indices. An Rx WTRU may, for example, associate the Tx WTRU with a configuration group and send a confirmation message, which may contain the selected one or more configuration group indices for the Tx WTRU. The Tx WTRU may assume that the selected configuration group(s) associated with its transmission are to reach the Rx WTRU, for example, when DRX is configured.

A Rx WTRU may select one or more configuration groups according to the priority of a Tx WTRU and/or the priority of the one or more configuration groups. In examples, a Tx WTRU may (e.g., during a unicast link (re)configuration) indicate to an Rx WTRU the transmission characteristics (e.g., traffic profile, priority, etc.). An Rx WTRU may, for example, associate a Tx WTRU with at least one of the configuration groups allowed in the Rx WTRU, e.g., based on a criterion (e.g., a parameter), which may include priority and/or suitability associated with the traffic profile indicated by the Tx WTRU. An Rx WTRU may send a confirmation message containing the selected configuration group index for the Tx WTRU.

An Rx WTRU may perform one of the following (e.g., if existing configuration groups allowed in the Rx WTRU are not suitable to be associated with a Tx WTRU): renegotiate with a Tx WTRU (e.g., based on a priority of the Tx WTRU), reject a connection establishment, or disable power savings/DRX. In examples, an Rx WTRU may renegotiate with a Tx WTRU (e.g., one Tx WTRU), for example, based on the priority of the Tx WTRU. For example, a priority associated with a Tx WTRU (e.g., a priority of established QoS flows and/or SLRBs) may be used to select and/or configure a new configuration group for the Tx WTRU and/or modify an association between existing configuration groups and other Tx WTRUs. For example, low priority Tx WTRUs may be assigned to fewer configuration groups and high priority Tx WTRUs may be accommodated within allowed configuration groups.

In the examples described herein, the priority transmitted by a Tx WTRU may be any of the following, or may be derived from any or a combination of the following. The priority may include a priority and/or a similar QoS parameter associated with traffic at the Tx WTRU (e.g., the highest priority of the WTRU's established SLRBs). The priority may include a priority configured for the WTRU by higher layers (e.g., which may indicate the importance of one or more configuration groups to the Tx WTRU with respect to power savings). The priority may be based on a number of dependencies active at the Tx WTRU where the dependency may be associated with a number of unicast links (e.g., with respective WTRUs) that are active at the Tx WTRU and/or configured with DRX. The dependency may be associated with a number of SLRBs configured for transmission or reception at the Tx WTRU. The priority may be based on the commonality of DRX configurations associated with different peer WTRUs. For example, the priority may be determined based on the number of overlapping slots between the different DRX configurations of the other WTRUs that are peers of the Tx WTRU.

In the examples described herein, the priority transmitted by a Tx WTRU may be any of the following, or may be derived from any or a combination of the following. The priority may be determined based on the total number/percentage of resources monitored (e.g., currently monitored) by the Tx WTRU (e.g., if considering the combination of multiple DRX cycles (e.g., all DRX cycles) configured with peer WTRUs) and/or the closeness of this value to a maximum. For example, a Tx WTRU for which the total number/amount of resources monitored for a DRX behavior is closest to a maximum may be configured with a higher priority. The maximum may be determined based on signaling from upper layers and/or WTRU capability. The priority may be determined based on the sidelink transmission power (e.g., average, total, minimum, or maximum transmission power) used and/or required by the Tx WTRU to reach one or more of its peer WTRUs (e.g., via unicast messaging). The priority may be determined based on a value configured as part of a SLRB configuration, or may be determined based on a function of such configured value. For example, a WTRU may be configured with a SLRB value and/or weight that is associated with a SLRB configuration (e.g., each SLRB configuration), and the WTRU may derive the priority based on the total or average weight associated with one or more established SLRBs (e.g., all established SLRBs corresponding to links where DRX is activated).

In the examples described herein, the priority transmitted by a Tx WTRU may be any of the following, or may be derived from any or a combination of the following. The priority may be determined based on a measure of how well a DRX configuration/configuration group meets the QoS requirements of the Tx WTRU (e.g., for a given traffic pattern at the Tx WTRU). In examples, the Tx WTRU may determine a priority based on how close the TX WTRU's expected traffic pattern is to a resource pattern of the DRX configuration. Closeness may be measured by one or more of the following. Closeness may be measured by a time difference between expected transmission time (e.g., of the Tx WTRU's traffic pattern) and the DRX configuration. Closeness may be measured by a measure of an expected percentage of transmission opportunities and/or expected transmissions that may occur within an active period associated with the DRX configuration and/or configuration group. Closeness may be measured by an amount of time in which data associated with a specific traffic pattern would need to be delayed, e.g., in order for the data to be transmitted in the active period corresponding to the DRX configuration. Closeness may be measured by an expected number of retransmissions and/or a reduction in the required number of retransmissions, e.g., which may be experienced if the traffic pattern is transmitted using the associated DRX configuration. Closeness may be measured by a priority comprising a value derived herein, or from a mapping between the measure herein and a priority value, e.g., where the mapping may be (pre)configured. The priority, the mapping, and/or the value may depend on and/or be adjusted by CBR. For example, the CBR experienced by the WTRU may determine the amount of delay compared to the data arrival.

In the examples described herein, the priority transmitted by a Tx WTRU may be any of the following, or may be derived from any or a combination of the following. The priority may be determined based on a measure of how well a DRX configuration/configuration group meets the QoS requirements of the Tx WTRU (e.g., for a given traffic pattern at the Tx WTRU). The Tx WTRU may determine a priority based on the amount of latency introduced in a transmission or a transmission pattern, e.g., if the transmission pattern is restricted to transmissions within the DRX configuration. For example, the Tx WTRU may be configured a mapping of additional latency and/or closeness (e.g., as described herein) to a priority value. For example, the priority value may be in terms of absolute additional latency incurred by the DRX configuration. For example, the Tx WTRU may determine a priority based on the amount of reliability that can be achieved or is achieved by a DRX configuration, and/or a measure of the loss of reliability incurred by the DRX configuration. For example, the Tx WTRU may be configured with a mapping between QoS and length of the on-duration to priority. A combination (e.g., each combination) of QoS and length of the on duration associated with a DRX configuration may be mapped to a priority. In examples, the mapping may reflect the loss in reliability, e.g., where highest priority is associated with a configuration that incurs no loss in reliability.

The Tx WTRU may send a set of DRX configurations to the Rx WTRU. In examples, the DRX configurations may represent possible DRX configurations (e.g., all possible DRX configurations) in the system or (pre)configured DRX configurations (e.g., all (pre)configured DRX configurations) that allow the Tx WTRU to meet its QoS requirements (e.g., a QoS latency requirement). The Tx WTRU may associate a priority to the one or more DRX configurations (e.g., to each DRX configuration). In examples, the Tx WTRU may determine the priority for a DRX configuration, e.g., where the DRX configuration is represented by a periodicity of resources and/or a time offset. The Tx WTRU may determine the priority of the DRX configuration based on the measured average/minimum/maximum latency introduced in the transmission by transmitting according to the DRX configuration. For example, the latency may be a measure of the time difference between an expected transmission time and a the timing of the resources in a DRX configuration. The Tx WTRU may be (pre)configured with a priority value for a value of latency (e.g., each value of latency). For example, high priority may be associated with lower latency.

A WTRU may determine the suitability of a configuration group or a set of configuration groups (e.g., whether a configuration group may be used at the WTRU, whether the set of configuration groups may be activated at the same time at the WTRU, etc.), for example, based on one or more of the following criteria: power savings capabilities (e.g., a Rx WTRU may select a set of configuration groups based on power saving capabilities), a WTRU type/capability/category (e.g., which may be static, or dynamically changeable during WTRU operation), remaining WTRU battery power, a number of active carriers at the WTRU, or a QoS of established bearers/flows in each of the sessions at the Tx/Rx WTRU.

In examples of determining the suitability of a set of configuration groups based on a WTRU type/capability/category, a category of WTRU(s) may be (pre)configured (e.g., configured or preconfigured) with a rule defining a maximum number of configuration groups, a maximum number of resources monitored across one or more of the configuration groups (e.g., all of the configuration groups), and/or an allowable difference (e.g. how many resources are not overlapping) between configuration groups. For example, a category of WTRU(s) may be (pre)configured (e.g., configured or preconfigured) with a rule defining the maximum number/density of resources a WRTU can actively monitor in an active or inactive state. The WTRU may determine whether it can activate multiple configuration groups, e.g., if the number of resources to be monitored by the set of configuration groups is below the configured maximum for the WTRU category. The WTRU may determine its capability, category, and/or type based on a static configuration at the WTRU. The WTRU may receive an indication of its capability, category, and/or type dynamically (e.g., from an upper layer). For example, the WTRU may receive an indication (e.g., an index) of a dynamic capability. The WTRU may be configured with a mapping between the index and a maximum allowable number/density of resources, allowable configuration groups, and/or allowable number/combination of configuration groups that may be activated at the WTRU.

In examples of determining the suitability of a set of configuration groups based on remaining WTRU battery power, a WTRU may receive (e.g., from an upper layer) an indication of the remaining battery power, and may map such remaining batter power to a maximum number of resources to be monitored and/or to a maximum density for the configuration groups activated.

In examples of determining the suitability of a set of configuration groups based on the QoS of established bearers and/or flows associated with a session (e.g., each session) at the Tx/Rx WTRU, a WTRU (e.g. a Tx WTRU) may establish and/or be configured with a mapping between established SLRB(s) and suitable configuration groups. A WTRU (e.g., a Tx WTRU) may establish and/or be configured with a mapping between active QoS flows and/or established SLRBs and suitable configuration group(s). A WTRU (e.g., an Rx WTRU) may receive activated QoS flows and/or established SLRBs from Tx WTRU(s), and may establish and/or be configured with a mapping between the active QoS flows and/or established SLRBs and the suitable configuration group(s).

Figure 3:
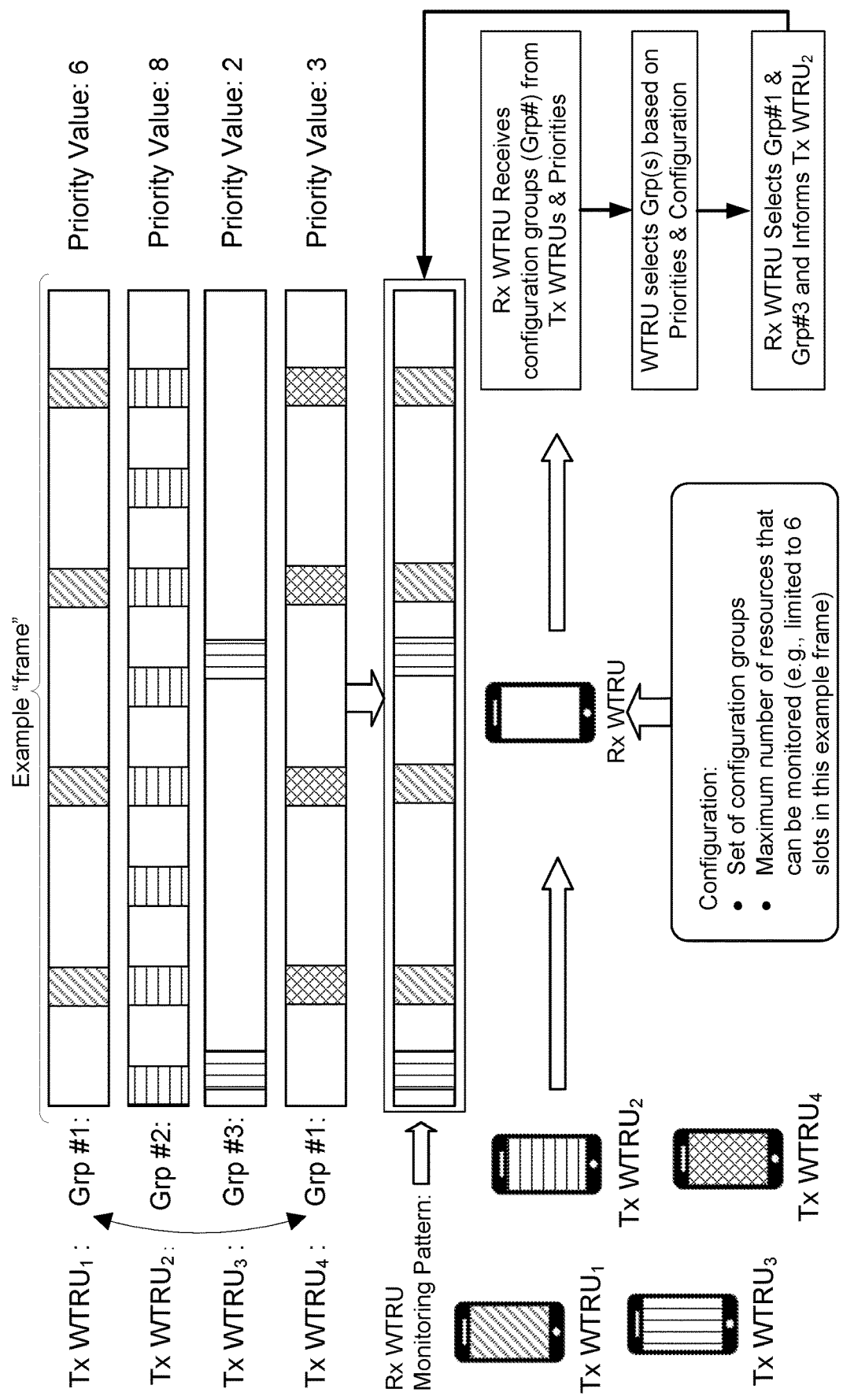
FIG. 3 is a diagram illustrating examples associated with configuration group selection.

FIG. 3 illustrates examples associated with selecting configuration groups (e.g., within a frame). A WTRU (e.g., an Rx WTRU) may receive a set of configuration groups (e.g., from the network) and/or an indication of a maximum number of resources that the WTRU may monitor (e.g., based on upper layer signaling and/or WTRU capability). The WTRU may receive from one or more other WTRUs (e.g., from each of the Tx WTRUs to which the Rx WTRU is configured with a unicast link) a configuration group and/or an associated priority. The WTRU may, e.g., upon reception of a configuration group from a peer WTRU, select the allowable configuration groups (e.g., across all of the Tx WTRUs) based on priorities and the configuration of the maximum number of resources. For example, the WTRU may select one or more configuration groups such that the maximum number of resources that can be monitored by the WTRU may not be exceeded. The WTRU may select the configuration groups in order of priority. The WTRU may, e.g., following such selection, inform the Tx WTRU that initiated the transmission of the configuration group(s) and/or other Tx WTRUs that are already configured with a configuration group all or a part of the following information: a confirmation of the use of a configuration group, an indication that an alternate configuration group should be selected, an indication that a currently configured configuration group should be changed, and/or the configuration group(s) selected by the WTRU (e.g., the Rx WTRU).

In examples described herein, a WTRU (e.g., an Rx WTRU) may select an activity configuration group by determining whether a received activity configuration group is suitable for communication with a peer Tx WTRU, for example, based on an associated priority and/or a maximum amount of resources that can be monitored (e.g., a resource bound or a resource limit). The activity configuration group may comprise one or more SL resources and/or an indication of an activity behavior (e.g., a DRX profile over the SL resources) associated with monitoring and/or receiving data transmission from the peer Tx WTRU. The Rx WTRU may perform one or more of the following when selecting the activity configuration group.

The Rx WTRU may receive information on an activity configuration group (e.g., an ID of the activity configuration group) from a first peer Tx WTRU, a priority value associated with the peer WTRU, and/or an SLRB established for the peer WTRU.

The Rx WTRU may determine whether the received activity configuration group is suitable for communication with the first peer Tx WTRU, for example, based on the follow criteria (e.g., one or more parameters). If the total number of resources for supporting the activity configuration groups of the first peer Tx WTRU and that of an existing second peer Tx WTRU is less than or equal to a maximum resource bound (e.g., which may be configured), the configuration group received from the first peer WTRU may be selected for the first peer WTRU while retaining the existing configuration group(s) for the second peer Tx WTRU. The Rx WTRU may combine the activity configuration groups of the first peer WTRU and the second peer WTRU such that the number of overlapping resources may be maximized. If the total number of resources associated with the activity configuration groups of the first peer Tx WTRU and the second peer Tx WTRU exceeds the maximum resource bound, the configuration group received from the first peer Tx WTRU may be selected for the first peer Tx WTRU and the second peer Tx WTRU (e.g., if the priority of the first peer Tx WTRU is higher than the priority of the second peer Tx WTRU). If the total number of resources associated with the activity configuration groups of the first peer Tx WTRU and the second peer Tx WTRU exceeds the maximum resource bound, the existing configuration group of the second peer Tx WTRU may be selected for the first peer Tx WTRU and the second peer Tx WTRU (e.g., if the priority of the second peer Tx WTRU is higher than the priority of the first peer Tx WTRU).

The Rx WTRU may send a selection message or confirmation message that includes information on a selected activity configuration group (e.g., an ID of the selected activity configuration group) to one or more corresponding peer Tx WTRUs.

Activity between Tx and Rx WTRUs may be synchronized (e.g., in unicast or groupcast). Transmissions/receptions during initial link establishment may be synchronized and/or coordinated. A peer WTRU may be informed of a change (e.g., for updating and realigning activity behavior), for example, if activity behavior changes in a WTRU. A change in activity behavior may be dependent on the amount of data being transmitted, for example, to maximize power savings. A procedure (e.g. implicit procedure) for synchronization of the activity state between Rx and Tx WTRUs may not be appropriate. Signaling associated with the synchronization may be limited, for example, if a WTRU is transmitting/receiving to/from multiple WTRUs.

An activation indicator may activate, deactivate, and/or change one or more activity and/or decoding behaviors configured at a WTRU. In examples, a WTRU may activate one or more activity behaviors (e.g., independent activity behaviors), for example, based on reception of an activation indicator. An activation indicator may be transmitted in the same resources as the transmission of actual data. An activation indicator may (e.g., alternatively) be transmitted in a separate set of resources (e.g., a configured resource pool), which may be referred to as an activation space herein.

For example, a WTRU's decoding activity may be decomposed into multiple spaces (e.g., two spaces), comprising, for example, an activation space and a data space that can be used, respectively, by an Rx WTRU for monitoring and/or decoding an activation indicator and/or receiving data from a peer WTRU. A Tx WTRU may use resources from the activation space, for example, to send an activation indicator, e.g., to allow subsequent data transmission. An activation indicator may be used to activate identified resources configured for a session, for example, if an Rx WTRU is configured with different resource pools for individual sessions.

An activation indicator may be sent, for example, in one or more of the following: a PSCCH transmission (e.g., first stage or second stage SCI in a two-stage SCI or a single stage SCI), a PSSCH transmission (e.g., an SL MAC control element (CE), PC5-RRC, data, and/or a periodic indicator), a PDCCH transmission (e.g., a DCI for network based activation), a physical downlink shared channel (PDSCH) transmission (e.g., a MAC CE, RRC for network based activation), or a physical channel transmission (e.g., a new physical channel transmission). For example, an activation indicator may represent a physical channel (e.g., a new physical channel) and may comprise one or more symbol/slot transmissions in a resource pool (e.g., a set of symbols in time/frequency within a resource pool, or a separate resource pool).

An activation space may be used for receiving (e.g., only receiving) an activation indicator and/or for receiving an activation indicator and data transmission. An activation space may be, for example, one or more of the following: a number of time slots in a resource pool, a stand-alone resource pool with a configurable number of subchannels and physical resource blocks (PRBs), or a sub-area of a resource pool (e.g., with a configurable number of subchannels/PRBs within each resource pool). An activation indicator may be sent in data space.

A Tx WTRU may be associated with multiple Rx WTRUs via unicast/groupcast connections. An activation indicator may be sent (e.g., sent individually) to a Rx WTRU (e.g., each Rx WTRU) via a unicast transmission (e.g., according to a link prioritization and/or ranking criteria). In examples, a first Rx WTRU may be selected before a second Rx WTRU for sending the activation indicator, for example, if a priority value associated with the first Rx WTRU is higher than a priority value associated with the second Rx WTRU.

An activation indicator may include (e.g., include implicitly or explicitly) one or more of the following: session(s)

being activated, data space information, timer information, a release indication; an index of an activation behavior, or a reciprocal transmission.

An activation indicator may include one or more sessions (e.g., identification of one or more unicast links) being activated. For example, an activation indicator may include the source/destination L2 ID of a unicast link to be activated at an Rx WTRU.

An activation indicator may include data space information. For example, an activation indicator may identify one or more second resource pools used to receive data associated with L2 ID(s). A WTRU may be (pre)configured (e.g., configured or preconfigured) with one or more resource pools to be activated for an L2 ID (e.g., each L2 ID). One or more L2 IDs in or associated with the activation indicator may indicate (e.g., implicitly indicate) resource pool(s) to be monitored by a WTRU.

An activation indicator may include time, duration of time, or timer information. For example, an activation indicator may indicate the duration for which one or more second resource pools may be used and/or may remain activated (e.g., prior to transitioning to DRX).

An activation indicator may include a release indication. For example, an activation indicator may indicate a command to release one or more second resource pools (e.g., or perform DRX for a second resource pool), for example, for a certain duration.

An activation indicator may include an index of an activation behavior (e.g., among multiple preconfigured activation behaviors) that may be activated or deactivated by the activation indicator.

An activation indicator may include a reciprocal transmission. An activation indicator may include a request for a Rx WTRU to respond and/or provide feedback (e.g., after activating the second resource pool(s)), for example, if the Rx WTRU has received (e.g., reliably received) the activation indicator and changed the Rx WTRU's activity behavior. An activation indicator may indicate a mode of response/feedback, which may include, for example, HARQ feedback and/or CSI feedback.

In examples, a data space for an L2 ID may be activated for receiving data, for example, if the corresponding L2 ID or an equivalent identifier is detected within the activation indicator in one or more associated activation spaces. A common activation space may be shared by multiple Tx WTRUs for activating one or more data spaces shared by the Tx WTRUs. The SCI and data may be transmitted in the data spaces, for example, following transmission of the activation indicator in the activation space. For example, an activation indicator may include a first stage SCI, which may identify the data space. An SCI sent in the data space may include a second stage SCI, which may be used to decode the data transmitted in the data spaces.

An activation indicator may enable a configured activation behavior (e.g., one of a set of configured activation behaviors). In examples, a WTRU may send an activation indicator to change an Rx WTRU's activity behavior (e.g., between multiple configured activity behaviors). The multiple configured activity behaviors may be, for example, pre-configured, configured by the network, and/or configured during PC5-RRC link configuration. An activation indicator may indicate a specific configuration (e.g., via an ID referring to a configuration among configurations that may be provided via PC5-RRC signaling) to be activated at the Rx WTRU. A WTRU may trigger activation of a configuration, for example, based on one or more of the following events: arrival of data (e.g., at a specific SLRB), transmission of data (e.g., all data associated with one or more SLRBs), a change of WTRU state, a change of measured sidelink congestion, or a time being reached/expiry of a duration of time/expiry of a timer (e.g., associated with one or more events described herein).

A WTRU may trigger activation of a configuration, for example, based on arrival of data (e.g., at a specific SLRB). For example, a WTRU may send an activation indictor upon arrival of data for transmission (e.g., in one or more WTRU buffers) for a specific SLRB and/or LCH. A WTRU may be configured with an association between an SLRB and an activity behavior configuration (e.g., to be used at a peer WTRU). A WTRU may activate an activity behavior (e.g., an appropriate activity behavior) upon arrival of data to an SLRB.

A WTRU may trigger activation of a configuration, for example, based on transmission (e.g., successful transmission) of data (e.g., all data associated with one or more SLRBs). A WTRU may send an activation indicator to change a configuration, for example, if data (e.g., all data) in the WTRU's buffer(s) (e.g., associated with one or more SLRBs) has been transmitted.

A WTRU may trigger activation of a configuration, for example, based on a change of WTRU state. A WTRU may send an activation indicator, for example, upon change of a WTRU coverage and/or a WTRU connection state (e.g., RRC_CONNECTED, RRC_IDLE, RRC_INACTIVE, out of coverage). A WTRU may send an activation indicator to a peer WTRU, for example, upon change between a relay/non-relay state at the WTRU (e.g., the WTRU starts/stops operating as a relay).

A WTRU may trigger activation of a configuration, for example, based on a change of measured sidelink congestion. A WTRU may send an activation indicator, for example, upon a change of congestion on sidelink (e.g., based on a channel busy ratio (CBR) measured by the WTRU, for example reaching or exceeding a threshold). A WTRU may be configured with an activity state configuration for a range of CBR (e.g., each range of CBR). A WTRU may send an activation indicator to change an activity state, for example, if the measured CBR changes from a first range (e.g., associated with a first activity state configuration) to a second range (e.g., associated with a second activity state configuration).

A WTRU may trigger activation of a configuration, for example, based on expiry of a timer (e.g., associated with one or more events described herein). A WTRU may send an activation indicator, for example, following a certain time after which one or more of the other events may have taken effect (e.g., for a time). For example, a WTRU may determine a first time, determine a first duration of time, start a timer, etc., for example upon transmission (e.g., successful transmission) of data (e.g., all data associated with one or more SLRBs). The WTRU may determine a second time, determine a second duration of time, reset the timer, etc. (e.g., each time new data arrives). A WTRU may send an activation indicator, for example, if a time is reached, a duration of time expires, the timer expires, etc. For example, a WTRU may determine a time, determine a duration of time start a timer upon reception of new data for transmission (e.g., associated with one or more SLRBs). A WTRU may reset the time, duration of time, timer, etc. for example, if new data is not received (e.g., associated with the same one or more SLRBs) over a predefined time period. A WTRU may send an activation indicator, for example, upon the time being reached, the duration of time expires, expiry of the timer, etc.

An activation indicator may be transmitted regularly and/or periodically in associated resources. An activation indicator may be sent, for example, periodically, in an associated set of resources. An activation indicator may indicate an associated data space that is currently active. A WTRU may monitor (e.g., regularly monitor) an activation space. An activation indicator may activate a resource pool and/or a set of resources that may be associated with a session (e.g., L2 ID). A WTRU may monitor the associated resources, for example, if an activation indicator is currently being transmitted. A WTRU may monitor the associated resources, for example, as long as the activation indicator is present in the activation space. A WTRU may (e.g., in the presence of an activation indicator activating a session) monitor resources associated with the session. A WTRU may not monitor resources associated with a session, for example, in the absence of an activation indicator (e.g., for one or more instances of resources associated with activation space) and/or in the absence of a session identifier in the activation indicator (e.g., for one or more instances of resources associated with an activation space).

An activation indicator may be transmitted, for example, upon activation of a session and/or activity behavior. In examples, a WTRU may monitor a set of resources associated with a session, for example, upon reception of an activation indicator identifying the session. A WTRU may continue to monitor the resources for the session, for example, based on conditions related to the activity behavior of the session. For example, a WTRU may (e.g., following activation of a session) determine a time associated with inactivity, a time period associated with inactivity, start an inactivity timer, etc. associated with reception for the session. A WTRU may (e.g., if the time is reached, the period of time expires, expiry of the timer, etc.) deactivate the session (e.g., stop monitoring the session or the session's activity behavior), for example, until the next reception of an activation indicator.

WTRU behavior with respect to the data space may be configured. A WTRU may monitor an activation space, e.g., while keeping the data space inactive, for example, to save power. In examples a unicast link may be considered active, for example, if the activation space includes an activation indicator from a peer WTRU. A WTRU may transition to DRX on the data space, for example, if an activation indicator is not detected. A WTRU may (e.g., if an activation indicator is detected) activate one or more corresponding data spaces for the reception of data (e.g., the subsequence reception of data) on the unicast link.

In examples, an active data space associated with one or more active sessions may comprise a WTRU monitoring resources (e.g., all resources in the form of a resource pool) associated with an active session (e.g., each active session). A WTRU may monitor (e.g., only monitor) the active sessions in the corresponding resources, for example, using methods described herein.

In an examples, an active data space may comprise activating one or more sessions. A session (e.g., each session) may have an associated activity behavior (e.g., DRX configuration or a similar activity behavior). A WTRU may perform channel monitoring, for example, according to the activated sessions' activity behaviors, e.g., as long as the sessions are activated by the activation indicator.

Multiple Tx WTRUs may use a common and/or dedicated activation space and/or dedicated data spaces. In examples, multiple Tx WTRUs and/or sessions may be configured with different activation resources. A WTRU may monitor an activation resource associated with each of the resource's sessions (e.g., active or inactive). In examples, an activation space may be common to a number of Tx WTRUs and/or sessions. For example, a number of Tx WTRUs associated with an Rx WTRU over different unicast links (e.g., L2 IDs) may have access to a common activation space that may be used, for example, to send (e.g., individually send) an activation indicator to an Rx WTRU before sending data. A common activation space may be configured with a different DRX profile (e.g., on duration and/or DRX duration) that may be tailored, for example, with respect to the requirements of associated Tx WTRUs, e.g., to enable timely transmission of the activation indicator. For example, a DRX profile used for a common activation space may comprise a wake-up interval that recurs, for example, with a periodicity that matches a Tx WTRU with the lowest delay bound requirement.

Resources (e.g., slots and/or subchannels within a resource pool) from a common activation space may constitute a transmission opportunity for a Tx WTRU (e.g., each Tx WTRU) to use, for example, if sending an activation indicator. The resources of a common activation space may be determined, for example, based on different attributes, which may include the number of Tx WTRUs/unicast links, the number of sessions, traffic characteristics of the L2 IDs and/or the type of activation indicator (e.g., periodic, single-shot, etc.). A common activation space may be configured/reconfigured, for example, during unicast link establishment. A common activation space may be indicated (e.g., in an in-coverage scenario) by the network to Tx WTRUs, for example, via dedicated RRC and/or SIB. Using a common activation space may improve resource usage efficiency. An activation space may become overloaded with the reception of a high number of activation indicators, for example, if an Rx WTRU supports a high number of unicast links. A load level in a common activation space may be controlled, for example, to enable a WTRU to identify (e.g., unambiguously identify) a session in need of activation.

A load level in a common activation space may be controlled, for example, by one or more of the following: random selection, sensing based selection, priority (e.g., priority based selection), time restrictions (e.g., time restriction based selection), WTRU location (e.g., WTRU location based selection), or resources associated with each session within an activation space. In examples of random selection, a Tx WTRU may randomly select one or more resources from an activation space to send the activation indicator to the Rx WTRU. In examples of sensing based selection, a Tx WTRU may select one or more resources from an activation space, for example, based on sensing and selection of available resources. In examples of priority based selection, a Tx WTRU may determine one or more resources, for example, based on priority of the data to be transmitted in the data space. In examples of time restriction based selection, a Tx WTRU may determine one or more resources, for example, based on a (pre)configured number of instances/period of time, counter/time window, etc. (e.g., associated with the session, the WTRU, and/or the data to be transmitted in the data space). In examples of WTRU location based selection, a Tx WTRU may determine one or more resources in the activation space, for example, based on the Tx WTRU's current location. In examples of selection based on resources associated with each session within an activation space, a Tx WTRU may activate a session, for example, by transmitting on a resource (e.g., time/frequency) associated with the session.

A WTRU may determine resources within a common activation space based on random selection. In examples (e.g., using an activation space common to multiple L2 IDs), transmission opportunities may be determined by a Tx WTRU (e.g., each Tx WTRU), for example, by selecting resources randomly/stochastically. A Tx WTRU may select one or more resources (e.g., many resources) from a common activation space (e.g., on a contention basis) to send an activation indicator, for example, using one or more of the following selection criteria (e.g., selection parameters): unweighted distribution or weighted distribution. In examples of unweighted distribution, resources (e.g., all resources) within a common activation space may be assigned an equal/uniform weight value. One or more resources may be selected, for example, randomly to send the activation indicator. Random selection may result in Tx WTRUs (e.g., all Tx WTRUs) having an equal probability to send an activation indicator. In examples of weighted distribution, resources within a common activation space may be assigned a weight value, which may be determined, for example, based on a rule. For example, a rule may allow assigned weight values to be proportional to an LCH priority value of an L2 ID, which may result in Tx WTRUs with high priority data having a higher probability to access resources and send an activation indicator earlier than Tx WTRUs with low priority data.

A WTRU may determine resources within a common activation space based on priority. In examples (e.g., using an activation space common to multiple L2 IDs), transmission opportunities may be determined by a Tx WTRU (e.g., each Tx WTRU), for example, based on a prioritization rule. A common activation space may be subdivided into different resource sets, for example, where a resource set (e.g., each resource set) may be assigned to a priority value. Different Tx WTRUs may identify resources used to send an activation indicator, for example, based on priority of a transmission. A Tx WTRU may send (e.g., directly send) data in a common activation space (e.g., in place of an activation indicator), for example, for high priority transmissions above a threshold (e.g., a configured threshold).

A WTRU may determine resources within a common activation space based on time restrictions. In examples (e.g., using an activation space common to multiple sessions), transmission opportunities may be determined by a Tx WTRU (e.g., each Tx WTRU) based on time restriction. A Tx WTRU (e.g., each Tx WTRU) may be configured, for example, with a time window restriction to select a resource and to send an activation indicator. For example, a Tx WTRU with data scheduled for transmission in the data space may access the Tx WTRU's allocated time window to send the activation indicator to the Rx WTRU.

A WTRU may determine resources within a common activation space based on location. In examples (e.g., using an activation space common to multiple L2 IDs), transmission opportunities may be determined by a Tx WTRU (e.g., each Tx WTRU), for example, based on location of the Tx WTRU. For example, a Tx WTRU (e.g., each Tx WTRU) may be configured with a mapping (e.g., between a zone and a partition of resources from a common activation space) for resource selection. A Tx WTRU with data scheduled for transmission in a data space may determine a location (e.g., of the Tx WTRU) and may identify the resources to be used for sending the activation indicator to the Rx WTRU (e.g., based on the location).

Resources within an activation space may be associated with a corresponding session and/or service. In examples, one or more resources (e.g., a subchannel, slot, symbol, etc.) in an activation space may be associated with a session. A Tx WTRU may activate a session, for example, by transmitting in an associated resource in an activation space. An Rx WTRU may monitor for a transmission in an activation space resource associated with a session, for example, to determine one or more data spaces to be activated for a reception (e.g., a subsequent reception) of data associated with the session, service, and/or L2 ID.

An Rx WTRU may inform one or more peer WTRUs about activity behavior change. In examples, an Rx WTRU may send an announcement message to one or more associated Tx WTRUs connected via unicast and/or groupcast links, for example, if there is a change in the Rx WTRU's activity behavior state (e.g., associated with one or more sessions). An Rx WTRU may send an activity change announcement after determining (e.g., only after determining) that associated Tx WTRU(s) are not transmitting and are in a receiving mode, for example, to increase a probability (e.g., ensure) that the Tx WTRU(s) receive and do not miss the transmission (e.g., due to a half-duplex constraint). For example, an Rx WTRU may send an activity change announcement, for example, based on receiving an end-marker indication from a Tx WTRU/network and/or based on internal tracking, e.g., by having a preconfigured and/or agreed upon timing/resource. A Tx WTRUs may (e.g., after receiving an activity change announcement) update an activity behavior corresponding to the Rx WTRU, which may be used to determine transmit opportunities (e.g., subsequent transmit opportunities) to send data. An announcement message may be sent, for example, in response to an activation indication from a peer WTRU. The announcement message may be sent for the same session or a different session, a WTRU, a bearer, etc. An indication may represent an activity state change for multiple sessions. For example, a Tx WTRU 2 (e.g., after receiving an announcement associated with a session for Tx WTRU 1) may change the timing related to transmissions of the Tx WTRU 2's session with the Rx WTRU. An announcement message (e.g., associated with an activation message for a session, a WTRU, a bearer, and/or the like) may change (e.g., implicitly change) the timing of WTRU transmissions by a Tx WTRU for another session. An announcement message may be transmitted by an Rx WTRU without reception of an activation message (e.g., based on an autonomous and/or data-related change in activity behavior at the Rx WTRU).

Transmission of an activity behavior change announcement by an Rx WTRU may be triggered, for example, by one or more of the following: deviation from a configured activity behavior, the end of an active/inactive duration, a time being reached, reset of an inactivity timer, or a change in location.

In examples of a deviation from a configured activity behavior, an Rx WTRU with configured expected activity behaviors (e.g., DRX cycle) with a first Tx WTRU and a second Tx WTRU may change an activity behavior of the Rx WTRU, for example, due to reception of activity change indication and/or data from a first Tx WTRU. Changing an activity behavior of the Rx WTRU based on activity change indication and/or data from a first Tx WTRU may result in activating one or more resource pools associated with the first Tx WTRU for reception of data. An Rx WTRU may send an announcement to the second Tx WTRU (e.g., informing the second Tx WTRU about the change in the activity behavior state), for example, if the Rx WTRU changes its activity behavior on the resource pool associated with the second Tx WTRU.

In examples of the end of an active/inactive duration, an Rx WTRU may send an activity change announcement at the end of an on-duration or at the end of a DRX/sleep duration associated with a session (e.g., one or more of the sessions).

In examples of resetting a time, duration of time, an inactivity timer, etc. where inactivity timer may be used as an example, an Rx WTRU may send an activity behavior change announcement, for example, following an event that resets an inactivity timer. For example, an Rx WTRU may send an activity behavior change announcement following reception of data (e.g., for another session), which may reset an inactivity timer (e.g., associated with a session). In examples, an Rx WTRU in an inactive state (e.g., where no receptions are performed in the configured resource pools for receiving data) may maintain an inactivity timer, which may be tracked by one or more associated Tx WTRU(s). An Rx WTRU may send an announcement to the associated Tx WTRU(s) (e.g., signaling a change in the Rx WTRU's activity behavior), for example, if a trigger (e.g., reception of an indication from the network and/or an indication of a change in the link congestion level, such as CBR reducing by a certain value) results in resetting the inactivity timer.

In examples of a change in location, an Rx WTRU may be configured with one or more geographical locations/zones that may prohibit transitioning to an inactive state. An announcement may be sent to associated Tx WTRUs (e.g., informing about the state change), for example, if the Rx WTRU moves to a zone that requires changing from an inactive state to an active state.

An activity behavior change announcement (e.g., sent by an Rx WTRU) may include, for example, one or more of the following: a state change, an L2 source/destination ID, a time duration, a resource pool, condition(s) and/or trigger(s) that caused (e.g., triggered the transmission of) the announcement, or a forward or relay request.

An activity behavior change announcement may include a state change. In examples, an inactive state may be indicated, for example, based on a transition to DRX/sleep. An active state may be indicated, for example, based on entering an on-duration/wake-up.

An activity behavior change announcement may include an L2 source/destination ID. For example, an Rx WTRU may list one or more of affected L2 IDs in an activity state indication. A Tx WTRU may determine the L2 IDs that are active or inactive (e.g., currently active or inactive), for example, based on reception of an activity state indication.

An activity behavior change announcement may include a time duration. For example, a time period (e.g., start and stop time slots) may be indicated in an announcement, for example, to signal the duration for which an activity change is valid.

An activity behavior change announcement may include a resource pool. For example, one or more resource pools configured for reception of data may be indicated in an announcement to associated Tx WTRUs.

An activity behavior change announcement may include one or more conditions and/or triggers that caused (e.g., triggered a transmission of) an announcement. For example, condition(s)/trigger(s) that may be monitored for changing and/or resetting an indicated state (e.g., the reception of an activity change instruction from network/Tx WTRU and/or a change in a link/load condition) may be indicated in an announcement to one or more Tx WTRU(s).

An activity behavior change announcement may include a forward/relay request. An announcement may include a request to a Tx WTRU to forward activity change information to an intended destination (e.g., a network node and/or a L2 destination ID), for example, if the activity behavior change is to be relayed to the network and/or another WTRU.

An activity change announcement may (e.g., for higher reliability) indicate a polling/reciprocal transmission from a Tx WTRU. In examples, a polling/reciprocal transmission may be sent (e.g., by a Tx WTRU) as an ACK/NACK feedback in HARQ or in a data PDU, for example, to confirm an activity state change indicated by a Rx WTRU is received and/or acknowledged at the Tx WTRU.

An activity behavior change announcement may be sent (e.g., sent individually) to a Tx WTRU (e.g., each Tx WRTU) via a unicast transmission, for example, if an Rx WTRU is associated with multiple Tx WTRUs via unicast/groupcast connections. For example, an Rx WTRU may select a first Tx WTRU before a second Tx WTRU for sending the activity change announcement, for example, if a priority associated with the first Tx WTRU is higher than a priority associated with a second Tx WTRU. The priority may represent a priority of the data received from each TX WTRU, for example.

A unicast transmission may be sent, for example, via one or more of the following: a PSCCH transmission (e.g., in a first stage or second stage SCI in a two-stage SCI, or in a single stage SCI), a PSFCH transmission (e.g., in HARQ ACK/NACK feedback if HARQ is enabled), a PSSCH transmission (e.g., in an SL MAC CE, PC5-RRC, data, presence of padding bits in MAC PDU, and/or a periodic indicator), a physical uplink shared channel (PUSCH) transmission (e.g., in a MAC CE, RRC, and/or data for indicating to network), or a new physical channel transmission (e.g., which may comprise one or more symbols/slots in a resource pool).

Tx WTRUs located within a communication range from an Rx WTRU may eavesdrop and overhear transmissions from the Rx WTRU (e.g., to determine the Rx WTRU's activity behavior), for example, if the L2 ID is indicated when transmitting an activity change announcement and/or other transmissions (e.g., ACK/NACK feedback) to associated Tx WTRU(s). Tx WTRUs located within a communication range may make an inference (e.g., a direct interference) on the activity behavior corresponding to L2 IDs of the Tx WTRUs and associated resource pools, for example, based on one or more inference rules that may be configured in the associated Tx WTRUs to determine whether the Tx WTRUs can perform transmissions in resource pools corresponding to L2 IDs of the Tx WTRUs. In examples, a set of one or more secondary L2 IDs may be configured for a primary L2 ID (e.g., each primary L2 ID) that is configured between the Tx WTRU and the Rx WTRU. A Tx WTRU may determine (e.g., implicitly infer) that the Rx WTRU has changed an activity behavior for resource pools associated with a primary L2 ID and that the Rx WTRU is ready to receive transmissions from the Tx WTRU, for example, if the Tx WTRU overhears at least one or a combination of the secondary L2 IDs via the transmissions made by the Rx WTRU.

An RX WTRU may send an activity change announcement to multiple peer WTRU(s) via a groupcast/broadcast transmission. In examples, an Rx WTRU may send an activity change announcement (e.g., simultaneously or concurrently) to multiple Tx WTRUs via a groupcast/broadcast control message. A decision to select a broadcast mode of transmission may be based on one or more conditions. In examples, a WTRU may send a broadcast activity change announcement, for example, based on one or more of the following conditions: a transmission mode of one or more Tx WTRUs, a presence of multiple Tx WTRUs within a transmission range, or a latency associated with a broadcast.

A WTRU may send a broadcast activity change announcement, for example, based on a transmission mode of one or more Tx WTRUs. For example, one or more of the associated Tx WTRUs may not be transmitting and may be in a receiving mode in a time slot/resource pool where a grant may be available for a broadcast transmission.

A WTRU may send a broadcast activity change announcement, for example, based on a presence of multiple Tx WTRUs within a transmission range. For example, multiple Tx WTRUs located within a transmission range may receive and decode (e.g., reliably receive and decode) an activity change indication, for example, if using a common transmission power setting at an Rx WTRU.

A WTRU may send a broadcast activity change announcement, for example, based on a latency associated with broadcast. A latency associated with a transmission of an activity change announcement to a Tx WTRU (e.g., each Tx WTRU) via one or more unicast transmissions may exceed a latency associated with one or more broadcast transmissions.

An activity change announcement in a groupcast/broadcast mode may be sent, for example, using a dedicated L2 source/destination ID. For example, an L2 source/destination ID (e.g., intended for groupcast/broadcast transmission) may be configured (e.g., initially configured) between an Rx WTRU and associated Tx WTRUs (e.g., each Tx WTRU), for example, during a link establishment (e.g., an initial link establishment via PC5-RRC).

Systems, methods, and instrumentalities are provided for an Rx WTRU to confirm an activity state change indication/announcement. In examples, a Tx WTRU may send a first transmission (e.g., comprising an activity change indication in an inactive time-duration/resource pool) followed by a second transmission (e.g., comprising data in an active on-duration/resource pool) to a Rx WTRU. In examples, the first transmission may be lost and/or may be erroneously decoded. In examples, an Rx WTRU may send an activity change announcement to one or more of the associated Tx WTRUs (e.g., to signal the Tx WTRU's ability or inability to receive the subsequent data transmission). In examples, an announcement message may not be reliably received by the intended Tx WTRU(s).

A WTRU may (e.g., to ensure that a first transmission including an activity change indication is reliably received) send a confirmation feedback to a peer WTRU (e.g., based on a received trigger and/or a pre-configuration), for example, if the WTRU undergoes an activity state change for performing data transmissions/receptions (e.g., subsequent data transmission/receptions). A WTRU may (e.g., to minimize overhead) tailor a resource selection, for example, to perform a transmission of confirmation feedback to a peer WTRU within a window of time duration and/or a resource pool (e.g., that may be pre-configured and/or known to a Tx WTRU and a Rx WTRU).

Transmission of a confirmation feedback may be configured to be sent, for example, via one or more of the following: HARQ feedback to a transmission, a CSI report, an autonomous measurement report, or an activity change announcement.

A confirmation feedback may be sent via HARQ feedback to a transmission. For example, a Tx WTRU may enable HARQ feedback for a first transmission to an Rx WTRU in an inactive time-duration/resource pool. A Tx WTRU may perform transmission in the active time-duration/resource pool, for example, after (e.g., only after) reception of the HARQ feedback from a peer WTRU.

A confirmation feedback may be sent via a CSI report. For example, a Tx WTRU may request a CSI reporting via a first transmission to a WTRU in an inactive time-duration/resource pool. A Tx WTRU may perform transmission in the active time-duration/resource pool, for example after (e.g., only after) reception of the CSI feedback from a peer WTRU.

A confirmation feedback may be sent via an autonomous measurement report. For example, an Rx WTRU may send a measurement report (e.g., a RSRP measurement report, a CSI measurement report, and/or the like), for example, following a transmission from a peer WTRU received in an inactive time-duration/resource pool, which may result in activating the active time-duration/resource pool. A Tx WTRU may perform transmission in the active time-duration/resource pool, for example, after (e.g., only after) reception of the measurement report.

A confirmation feedback may be sent via an activity change announcement. For example, an Rx WTRU may transmit an activity change announcement, for example, following reception of an activity change indication in an inactive time-duration/resource and/or following a first transmission in an active on-duration/resource pool.

A Tx WTRU may perform transmission in an active time-duration/resource pool, for example, after (e.g., only after) reception of a confirmation from a peer WTRU.

A transmission of a confirmation feedback may be required/configured, for example, periodically, following a time being reached, expiry of a duration of time, expiry of a timer, etc. and/or prior to or following transmission of a specific type of data.

In examples of transmission of a confirmation feedback periodically, transmission with confirmation may be required one or more N slots (e.g., every N slots).

In examples of transmission of a confirmation feedback following a time, expiry of a duration of time, expiry of a timer, etc., where the timer may be used as an example, the timer may be reset (e.g., following expiry), for example, by one or more of the following events: transmission/reception of a confirmation feedback or transmission/reception of data on a unicast link.

In examples of transmission of a confirmation feedback prior to or following transmission of data of a specific type, a WTRU may be configured with a confirmation feedback behavior (e.g., as described herein), for example, if transmission is associated with data of a specific priority, cast (e.g., unicast or groupcast), type (e.g., DRB or SRB), etc.

Systems, methods, and instrumentalities are described for an Rx WTRU to confirm an activity state change indication via groupcast. In examples, a confirmation feedback may be sent by an Rx WTRU (e.g., by each Rx WTRU after changing to an active state), for example, to ensure that an activity change indication sent by a Tx WTRU is reliably received at associated Rx WTRUs (e.g., all associated Rx WTRUs) in a groupcast scenario. One or more of the following methods may be applied to groupcast: groupcast HARQ feedback or activity change response (e.g., explicit activity change response) via unicast.

Groupcast HARQ feedback may be applied to groupcast. For example, a Tx WTRU may enable HARQ Option 2 for an activity state indication and/or a first transmission resulting in a change of activity state. An indication to use Option 2 HARQ may be sent, for example, in an activity change indication in an inactivity time-duration/resource pool and/or a first data transmission in an active on-duration/resource pool. In an examples, Rx WTRUs (e.g., all Rx WTRUs) may be pre-configured (e.g., during groupcast connection (re) configuration) to use Option 2, for example, if transmitting HARQ feedback (e.g., after receiving a trigger to change an activity state). A dedicated mapping may be configured (e.g., within a PSFCH resource pool) to send a feedback indication, for example, if a trigger to change an activity state is received. A Rx WTRU (e.g., each Rx WTRU) may (e.g., if enabling HARQ) track a time, track a duration of time, start a timer, etc, where a timer may be used as an example, upon receiving an activity state change trigger and/or sending a feedback indication (e.g., in a first time slot after expiry of the timer). A Rx WTRU (e.g., each Rx WTRU) in a group may be configured with a different duration for an inactivity timer (e.g., to prevent collisions within the group). The timer may be configured, for example, based on a member ID of a WTRU within the group.

An activity change response (e.g., an explicit activity change response) via unicast may be applied to groupcast. For example, a Rx WTRU (e.g., each Rx WTRU) in a group may (e.g., upon receiving a trigger to change activity state from a Tx WTRU) send a change response (e.g., an explicit change response) via a unicast transmission (e.g., after changing to an indicated activity state). A unicast transmission may comprise one or more of the transmissions discussed in a previous embodiment associated with unicast (e.g., measurement reports, etc.).

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

We claim:

1. A wireless transmit/receive unit (WTRU), comprising: a processor configured to:
send a first message to a peer WTRU via a PC5-Radio Resource Control (RRC) connection, wherein the PC5-RRC connection is configured with Discontinuous Reception (DRX), and wherein the first message requests a change in configuration of the PC5-RRC connection;
receive a rejection of the request from the peer WTRU; and
subsequent to the rejection, communicate with the peer WTRU via the PC5-RRC connection using unicast sidelink communication without DRX.

2. The WTRU of claim 1, wherein the processor is further configured to, subsequent to the rejection, perform continuous monitoring of a physical sidelink control channel PSCCH of the PC5-RRC connection.

3. The WTRU of claim 1, wherein the first message is a sidelink PC5-RRC reconfiguration message.

4. The WTRU of claim 1, wherein the change in configuration of the PC5-RRC connection comprises a change of DRX configuration.

5. The WTRU of claim 1, wherein the change in configuration of the PC5-RRC connection comprises a change of timer configuration.

6. The WTRU of claim 1, wherein the change in configuration of the PC5-RRC connection comprises a change of pattern.

7. The WTRU of claim 1, wherein the change in configuration of the PC5-RRC connection comprises a change in activity behavior of the peer WTRU.

8. The WTRU of claim 1, wherein the change in configuration of the PC5-RRC connection comprises a change in reception behavior of the peer WTRU.

9. The WTRU of claim 1, wherein the rejection indicates a DRX configuration failure.

10. A method associated with a wireless transmit/receive unit (WTRU), the method comprising:
sending a first message to a peer WTRU via a PC5-Radio Resource Control (RRC) connection, wherein the PC5-RRC connection is configured with Discontinuous Reception (DRX), and wherein the first message requests a change in configuration of the PC5-RRC connection;
receiving a rejection of the request from the peer WTRU; and
subsequent to the rejection, communicating with the peer WTRU via the PC5-RRC connection using unicast sidelink communication without DRX.

11. The method of claim 10, wherein the first message is a sidelink PC5-RRC reconfiguration message.

12. The method of claim 10, wherein the change in configuration of the PC5-RRC connection comprises a change of DRX configuration.

13. The method of claim 10, further comprising:
subsequent to the rejection, performing continuous monitoring of a physical sidelink control channel (PSCCH) of the PC5-RRC connection.

14. The method of claim 10, wherein the change in configuration of the PC5-RRC connection comprises a change of timer configuration.

15. The method of claim 10, wherein the change in configuration of the PC5-RRC connection comprises a change of pattern.

16. The method of claim 10, wherein the change in configuration of the PC5-RRC connection comprises a change in activity behavior of the peer WTRU.

17. The method of claim 10, wherein the change in configuration of the PC5-RRC connection comprises a change in reception behavior of the peer WTRU.

18. The method of claim 10, wherein the rejection indicates a DRX configuration failure.

* * * * *